(12) United States Patent
Beck et al.

(10) Patent No.: US 10,596,422 B2
(45) Date of Patent: *Mar. 24, 2020

(54) METHOD, APPARATUS, AND SYSTEM FOR GOLF PRODUCT RECONFIGURATION

(71) Applicant: SUMITOMO RUBBER INDUSTRIES, LTD., Kobe (JP)

(72) Inventors: Christopher J. Beck, Costa Mesa, CA (US); Casey Casburn, Lakewood, CA (US); John J. Rae, Westminster, CA (US); Aram Salehi, Tustin, CA (US)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,939

(22) Filed: Mar. 1, 2019

(65) Prior Publication Data

US 2019/0192932 A1 Jun. 27, 2019

Related U.S. Application Data

(60) Continuation of application No. 15/978,433, filed on May 14, 2018, now Pat. No. 10,258,839, which is a
(Continued)

(51) Int. Cl.
*A63B 53/04* (2015.01)
*A63B 53/06* (2015.01)
(Continued)

(52) U.S. Cl.
CPC .......... *A63B 53/0466* (2013.01); *A63B 53/06* (2013.01); *A63B 60/00* (2015.10);
(Continued)

(58) Field of Classification Search
CPC .... A63B 2053/0491; A63B 2053/0433; A63B 53/0466; A63B 2053/0412
(Continued)

(56) References Cited

U.S. PATENT DOCUMENTS 2,155,830 A 4/1939 Howard
3,979,123 A 9/1976 Belmont
(Continued)

OTHER PUBLICATIONS

Feb. 2, 2015 Office Action issued in U.S. Appl. No. 13/312,455.
(Continued)

*Primary Examiner* — Sebastiano Passaniti
(74) *Attorney, Agent, or Firm* — Oliff PLC

(57) ABSTRACT

A wood-type golf club head includes first and second ribs projecting from a bottom club head wall portion, the wall portion, the first rib, and the second rib forming an elongate recess defining a weight path. A weight element is translatable along the weight path and includes a first weight portion, a second weight portion, and a fastener, the first and second ribs each being interposed between the first weight portion and the second weight portion such that the first weight portion is located proximate the club head wall portion and the second weight portion is located distal the club head wall portion. The second weight portion has a contact surface that includes a recessed region, and when the weight element is in a secured position, at least a portion of the first weight portion is located within the recessed region.

20 Claims, 29 Drawing Sheets

Related U.S. Application Data continuation of application No. 15/468,701, filed on Mar. 24, 2017, now Pat. No. 9,993,703, which is a continuation of application No. 14/467,592, filed on Aug. 25, 2014, now Pat. No. 9,636,556, which is a division of application No. 13/312,455, filed on Dec. 6, 2011, now Pat. No. 9,216,330.

(60) Provisional application No. 61/436,715, filed on Jan. 27, 2011.

(51) Int. Cl.

| | | |
|---|---|---|
| *A63B 60/00* | (2015.01) | |
| *A63B 60/42* | (2015.01) | |
| *A63B 71/06* | (2006.01) | |
| *G01S 19/19* | (2010.01) | |

(52) U.S. Cl.
CPC .......... *A63B 60/42* (2015.10); *A63B 71/0622* (2013.01); *A63B 2053/0433* (2013.01); *A63B 2053/0437* (2013.01); *A63B 2053/0491* (2013.01); *A63B 2071/068* (2013.01); *A63B 2071/0694* (2013.01); *A63B 2220/12* (2013.01); *A63B 2220/70* (2013.01); *A63B 2220/72* (2013.01); *A63B 2220/75* (2013.01); *A63B 2220/76* (2013.01); *A63B 2225/20* (2013.01); *A63B 2225/50* (2013.01); *G01S 19/19* (2013.01)

(58) Field of Classification Search
USPC .................................. 473/324–350, 287–292
See application file for complete search history.

(56) References Cited

U.S. PATENT DOCUMENTS

| | | | |
|---|---|---|---|
| 4,811,949 | A | 3/1989 | Kobayashi |
| 4,895,371 | A | 1/1990 | Bushner |
| 5,365,427 | A | 11/1994 | Soignet et al. |
| 5,591,091 | A | 1/1997 | Hackman |
| 5,683,309 | A | 11/1997 | Reimers |
| 5,769,737 | A | 6/1998 | Holladay et al. |
| 6,015,354 | A | 1/2000 | Ahn et al. |
| 6,083,123 | A | 7/2000 | Wood |
| 6,379,264 | B1 | 4/2002 | Forzano |
| 6,565,448 | B2 | 5/2003 | Cameron et al. |
| 6,669,571 | B1 | 12/2003 | Cameron et al. |
| 6,702,692 | B1 | 3/2004 | Smith |
| 6,719,648 | B1 | 4/2004 | Smith |
| 7,004,852 | B2 * | 2/2006 | Billings .................. A63B 53/04 473/332 |
| 7,147,573 | B2 | 12/2006 | DiMarco |
| 7,166,035 | B2 | 1/2007 | Voges et al. |
| 7,166,040 | B2 | 1/2007 | Hoffman et al. |
| 7,166,041 | B2 | 1/2007 | Evans |
| 7,201,669 | B2 | 4/2007 | Stites et al. |
| 7,207,902 | B1 | 4/2007 | Hamlin |
| 7,351,161 | B2 | 4/2008 | Beach |
| 7,413,517 | B2 | 8/2008 | Butler, Jr. et al. |
| 7,503,858 | B2 | 3/2009 | Cameron |
| 7,520,820 | B2 | 4/2009 | Dimarco |
| 7,572,193 | B2 | 8/2009 | Yokota |
| 7,611,424 | B2 | 11/2009 | Nagai et al. |
| 7,762,911 | B2 | 7/2010 | Gobush et al. |
| 7,775,905 | B2 | 8/2010 | Beach et al. |
| 7,867,110 | B2 | 1/2011 | Edel |
| 8,016,694 | B2 | 9/2011 | Llewellyn et al. |
| 8,202,175 | B2 | 6/2012 | Ban |
| 8,308,583 | B2 | 11/2012 | Morris et al. |
| 8,360,899 | B2 | 1/2013 | Swartz et al. |
| 8,444,505 | B2 | 5/2013 | Beach et al. |
| 8,734,271 | B2 | 5/2014 | Beach et al. |
| 8,894,506 | B1 | 11/2014 | Myers et al. |
| 9,636,556 | B2 | 5/2017 | Beck et al. |
| 9,993,703 | B2 | 6/2018 | Beck et al. |
| 10,004,956 | B2 | 6/2018 | Beck et al. |
| 10,258,839 | B2 * | 4/2019 | Beck ..................... A63B 53/00 |
| 2003/0008731 | A1 | 1/2003 | Anderson et al. |
| 2004/0043839 | A1 | 3/2004 | Inoue et al. |
| 2004/0132541 | A1 | 7/2004 | MacIlraith |
| 2004/0204257 | A1 | 10/2004 | Boscha et al. |
| 2006/0122004 | A1 | 6/2006 | Chen et al. |
| 2006/0166757 | A1 | 7/2006 | Butler et al. |
| 2006/0240908 | A1 | 10/2006 | Adams et al. |
| 2006/0281580 | A1 | 12/2006 | Kim et al. |
| 2007/0049393 | A1 | 3/2007 | Gobush |
| 2007/0298896 | A1 | 12/2007 | Nusbaum et al. |
| 2008/0020861 | A1 | 1/2008 | Adams et al. |
| 2008/0261715 | A1 | 10/2008 | Carter |
| 2009/0069908 | A1 | 3/2009 | Butler, Jr. et al. |
| 2009/0221380 | A1 | 9/2009 | Breier et al. |
| 2009/0222206 | A1 | 9/2009 | Burns et al. |
| 2010/0041493 | A1 | 2/2010 | Clausen et al. |
| 2010/0075773 | A1 | 3/2010 | Casati, Jr. |
| 2011/0053698 | A1 | 3/2011 | Stites et al. |
| 2011/0053705 | A1 | 3/2011 | Stites |
| 2013/0225317 | A1 | 8/2013 | Clausen et al. |
| 2013/0324299 | A1 | 12/2013 | Clausen et al. |
| 2015/0297961 | A1 | 10/2015 | Voshall et al. |
| 2015/0306475 | A1 | 10/2015 | Curtis et al. |

OTHER PUBLICATIONS

Jun. 5, 2015 Office Action issued in U.S. Appl. No. 13/312,455.
Jun. 30, 2016 Office Action issued in U.S. Appl. No. 14/942,357.
Dec. 1, 2016 Office Action issued in U.S. Appl. No. 14/467,592.
Promenschenkel, Mizuno MP-600 Driver Review, Apr. 12, 2008, http://thesandtrap.com/b/clubs/mizuno_mp-600_review.
Oct. 16, 2013 Office Action issued in U.S. Appl. No. 13/312,455.
May 5, 2014 Office Action issued in U.S. Appl. No. 13/312,455.
Apr. 28, 2016 Office Action issued in U.S. Appl. No. 14/467,592.
Jun. 22, 2017 Office Action Issued in U.S. Appl. No. 15/402,731.
Jul. 24, 2017 Office Action Issued in U.S Appl. No. 15/468,701.
Jul. 25, 2017 Office Action Issued in U.S Appl. No. 15/468,602.
Oct. 2, 2018 Office Action issued in U.S. Appl. No. 15/978,433.

* cited by examiner

| | "ACTUAL ADJUSTMENT" VALUE | | "SCALED ADJUSTMENT" VALUE |
|---|---|---|---|
| IF | -5 | THEN | -2 |
| IF | -4 | THEN | -2 |
| IF | -3 | THEN | -2 |
| IF | -2 | THEN | -2 |
| IF | -1 | THEN | -1 |
| IF | 0 | THEN | 0 |
| IF | 1 | THEN | 1 |
| IF | 2 | THEN | 2 |
| IF | 3 | THEN | 2 |
| IF | 4 | THEN | 2 |
| IF | 5 | THEN | 2 |

264

| RECONFIGURATION INFORMATION ||
|---|---|
| Face angle | Lie angle |
| Open 2.0 | 1.0 |
| Open 1.5 | 0.5 |
| Open 1.5 | 1.5 |
| Open 1.0 | 0.0 |
| Open 1.0 | 2.0 |
| Square | 0.0 |
| Square | 2.0 |
| Closed 1.0 | 0.0 |
| Closed 1.0 | 2.0 |
| Closed 1.5 | 0.5 |
| Closed 1.5 | 1.5 |
| Closed 2.0 | 1.0 |

266

Negative Adjustment ↑

Positive Adjustment ↓

| USER INPUT OF "WIND CONDITIONS" | | USER INPUT OF "TURF CONDITIONS" | | "TRAJECTORY CHANGE VALUE" | |
|---|---|---|---|---|---|
| IF | 1 | AND IF | 1 | THEN | HIGHER |
| IF | 1 | AND IF | 2 | THEN | HIGHER |
| IF | 1 | AND IF | 3 | THEN | HIGHER |
| IF | 1 | AND IF | 4 | THEN | SAME |
| IF | 1 | AND IF | 5 | THEN | SAME |
| IF | 2 | AND IF | 1 | THEN | HIGHER |
| IF | 2 | AND IF | 2 | THEN | HIGHER |
| IF | 2 | AND IF | 3 | THEN | HIGHER |
| IF | 2 | AND IF | 4 | THEN | SAME |
| IF | 2 | AND IF | 5 | THEN | SAME |
| IF | 3 | AND IF | 1 | THEN | HIGHER |
| IF | 3 | AND IF | 2 | THEN | HIGHER |
| IF | 3 | AND IF | 3 | THEN | SAME |
| IF | 3 | AND IF | 4 | THEN | SAME |
| IF | 3 | AND IF | 5 | THEN | LOWER |
| IF | 4 | AND IF | 1 | THEN | SAME |
| IF | 4 | AND IF | 2 | THEN | SAME |
| IF | 4 | AND IF | 3 | THEN | LOWER |
| IF | 4 | AND IF | 4 | THEN | LOWER |
| IF | 4 | AND IF | 5 | THEN | LOWER |
| IF | 5 | AND IF | 1 | THEN | LOWER |
| IF | 5 | AND IF | 2 | THEN | LOWER |
| IF | 5 | AND IF | 3 | THEN | LOWER |
| IF | 5 | AND IF | 4 | THEN | LOWER |
| IF | 5 | AND IF | 5 | THEN | LOWER |

356

| USER INPUT OF "FAIRWAY CONDITIONS" | | "SWING WEIGHT" VALUE | |
|---|---|---|---|
| IF | 1 | THEN | HEAVIER |
| IF | 2 | THEN | HEAVIER |
| IF | 3 | THEN | SAME |
| IF | 4 | THEN | LIGHTER |
| IF | 5 | THEN | LIGHTER |

FIG. 6(f)

| CURRENT WEIGHT CONFIGURATION | | | IF HEAVIER/HIGHER | | IF HEAVIER/LOWER | | IF LIGHTER/HIGHER | | IF LIGHTER/LOWER | |
|---|---|---|---|---|---|---|---|---|---|---|
| | FRONT | BACK | FRONT | BACK | FRONT | BACK | FRONT | BACK | FRONT | BACK |
| FOR 3 7 THEN DESIRED CONFIGURATION IS: | 3 | 7 | 3 | 11 | 7 | 7 | 3 | 7 | 7 | 3 |
| FOR 3 11 THEN DESIRED CONFIGURATION IS: | 3 | 11 | 3 | 11 | 7 | 11 | 3 | 11 | 3 | 7 |
| FOR 7 3 THEN DESIRED CONFIGURATION IS: | 7 | 3 | 7 | 7 | 3 | 3 | 3 | 7 | 7 | 3 |
| FOR 7 7 THEN DESIRED CONFIGURATION IS: | 7 | 7 | 7 | 11 | 11 | 7 | 3 | 11 | 7 | 3 |
| FOR 7 11 THEN DESIRED CONFIGURATION IS: | 7 | 11 | 7 | 11 | 11 | 7 | 3 | 7 | 7 | 7 |
| FOR 11 3 THEN DESIRED CONFIGURATION IS: | 11 | 3 | 11 | 7 | 11 | 3 | 7 | 3 | 11 | 3 |
| FOR 11 7 THEN DESIRED CONFIGURATION IS: | 11 | 7 | 7 | 11 | 11 | 7 | 7 | 7 | 11 | 3 |

METHOD, APPARATUS, AND SYSTEM FOR GOLF PRODUCT RECONFIGURATION

RELATED U.S. APPLICATION DATA

This application is a continuation of U.S. patent application Ser. No. 15/978,433, filed May 14, 2018, which in turn is a continuation of U.S. patent application Ser. No. 15/468,701, filed Mar. 24, 2017, which is a continuation of U.S. patent application Ser. No. 14/467,592, filed Aug. 25, 2014, which is a divisional application of U.S. patent application Ser. No. 13/312,455, filed Dec. 6, 2011. Application Ser. No. 13/312,455 in turn claims priority under 35 U.S.C. § 119(a) to U.S. Patent Application Ser. No. 61/436,715, filed Jan. 27, 2011. The disclosures of these prior applications are hereby incorporated by reference.

COPYRIGHT AUTHORIZATION

The disclosure below may be subject to copyright protection. The copyright owner has no objection to the facsimile reproduction by anyone of the documents containing this disclosure, as they appear in the Patent and Trademark Office records, but otherwise reserves all applicable copyrights.

BACKGROUND

As technology has progressed, the extent to which golfers may customize golf products has significantly increased. For example, golf clubs have increasingly included user-adjustable features. In particular, golf club manufacturers have introduced golf clubs with one or more interchangeable weight elements removably secured within corresponding weight ports. Also, manufacturers have introduced devices, e.g. repositionable shafts, for user-adjustment of face angle, loft angle and/or lie angle of a golf club. As another example, manufacturers have provided for greater selection of golf clubs and golf balls, and components thereof, from an array of distinct golf clubs and golf balls, and components thereof, respectively, based on golfer swing characteristics, preferences, and course conditions.

However, the effect on actual performance of a reconfiguration of a golf club property or a selection of a specific golf club or golf ball, is often difficult to anticipate, particularly for a golfer in the midst of play. For example, for a golf club having multiple interchangeable weight elements and a repositionable shaft, the relationship between the configuration of each interchangeable weight element and shaft position and their effect on the trajectory shape of a hit golf ball is complex. Further, characteristics external to the golf club, such as average wind speed, elevation, and fairway conditions also contribute to the performance of the golf club in an interrelated manner. Because of such complexity, a golfer's ability to capitalize on user-adjustable features and the available selection of golf products and components is significantly limited.

SUMMARY

Hence, a need exists for a method, apparatus, and system for assisting a golfer in anticipating the effects of reconfiguring one or more user-adjustable features of the golf club on golf club performance.

Accordingly, a computer program according to an example of the invention may perform steps including: receiving a first data input corresponding to a current configuration of an adjustable feature of the golf club, receiving a second data input corresponding to trajectory adjustment information, generating reconfiguration information that corresponds to one of a plurality of configurations of the adjustable feature of the golf club, based on the first data input and the second data input, and outputting the reconfiguration information.

Another aspect may include a system having a property-adjustable golf club and a correlated software program. The golf club may include a golf club head, a shaft secured to the golf club head, and a first adjustment feature reconfigurable between any of a first plurality of configurations. A first property of the golf club varies between each of the first plurality of configurations. The software program performs steps including: receiving a first data input corresponding to a current configuration of the first adjustment feature, receiving a second data input corresponding to trajectory adjustment information, generating reconfiguration information that corresponds to one of the first plurality of configurations of the first adjustment feature, based on the first data input and the second data input, and outputting the reconfiguration information.

Another aspect may include a system having a property-adjustable golf club and a software program. The golf club includes a golf club head, a shaft secured to the golf club head, a first adjustment feature reconfigurable between a first plurality of configurations such that a first property of the golf club varies between each of the first plurality of configurations, and a second adjustment feature reconfigurable between a second plurality of configurations such that a second property of the golf club varies between each of the second plurality of configurations. The software program performs steps including: receiving a first data input corresponding to one of the first plurality of configurations, receiving a second data input corresponding to one of the second plurality of configurations, generating resultant information by correlating the first data input with the second data input, and displaying the resultant information on an electronic display device.

The various exemplary aspects described above may be implemented individually or in various combinations. These and other features and advantages of the methods, devices, and systems according to the invention in its various aspects and demonstrated by one or more of the various examples will become apparent after consideration of the ensuing description, the accompanying drawings, and the appended claims.

BRIEF DESCRIPTION OF THE DRAWINGS

The drawings described below are for illustrative purposes only and are not intended to limit the scope of the present invention in any way. Exemplary implementations will now be described with reference to the accompanying drawings, wherein:

FIG. 6(b) illustrates various logic-enabled databases for use in conjunction with the sub-process of FIG. 6.

FIG. 6(f) illustrates various logic-enabled databases for use in conjunction with the sub-process of FIG. 6.

FIG. 6(g) illustrates a logic-enabled database for use in conjunction with the sub-process of FIG. 6.

DETAILED DESCRIPTION

Figure 1:
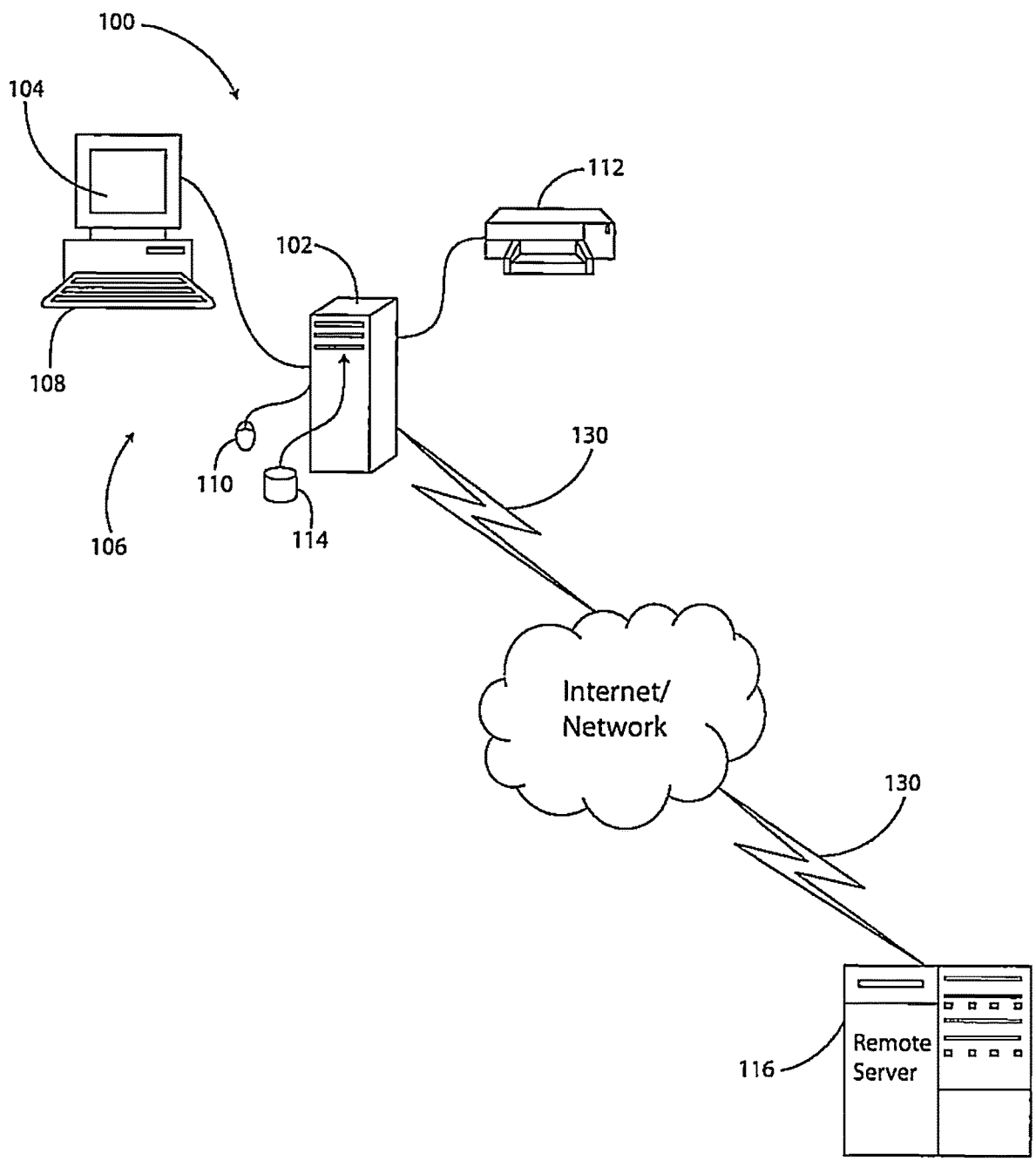
FIG. 1 is a diagrammatical view of a computing system, in communication with external features, according to one or more aspects of the present invention.

Referring to FIG. 1, a computing machine 100, e.g. a personal computer, is shown. The computing machine 100 includes an electronic display 104, a user interface 106 including a mouse 114 and a keyboard 108, and a central processing unit (CPU) 102. The electronic display 104 may comprise a liquid crystal display (LCD), a plasma display, a dot matrix display, a transreflective backlit display, or any other display technology that enables viewing of textual, graphical, and/or video information. In one or more aspects of the present invention, a printing device 112 communicates with the central processing unit 102. A removable storage device 114 is shown. The removable storage device 114 may compromise a CD-ROM type storage medium or other removable storage device known in the art.

In one or more aspects of the present invention, the computing machine 100 is connected to the Internet or local network via a communication link 130, whereupon information may be transmitted to, and/or received from, remote servers, e.g. a remote server 116, or other networked computers. In one or more aspects of the present invention, the communication link 130 comprises a conventional wireless communication link. In alternative aspects of the present invention, the communication link 130 comprises cabling or the like.

Figure 1A:
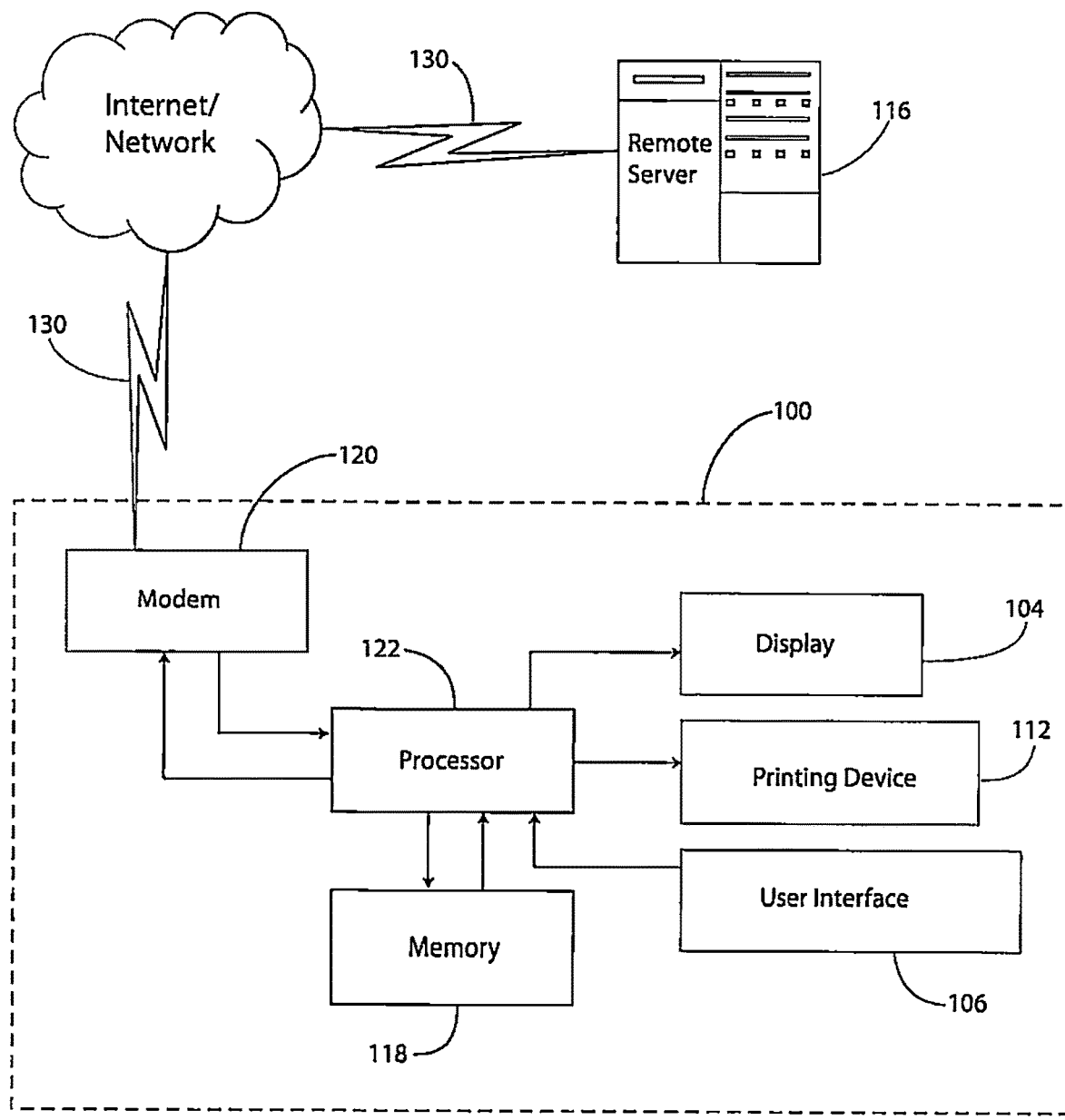
FIG. 1(a) is a schematic view of the computing system of FIG. 1 showing further detail.

Referring to FIG. 1(a), the computing machine 100 includes a hardware processor 122. The processor 122 communicates with the display 104, the user interface 106, a modem 120 for transmitting data to, and receiving data from, the Internet or other network of remote computers. The processor 122 further communicates with a memory device 118, i.e. a storage medium, which includes a volatile memory device, a non-volatile memory device, or both. Software programs, such as any of the inventive programs described below, may be stored on the memory device 118 to be executed by the processor 122. Alternatively, or in addition, software programs, such as any of the inventive programs described below, may be stored on the removable storage device 114 (see FIG. 1) to be executed by the processor 122. Alternatively, or in addition, software programs, such as any of the inventive programs described below, may be stored on a memory device associated with the remote server 116 to be executed by the processor 122 by the transfer of data to and from the modem 120.

Figure 2:
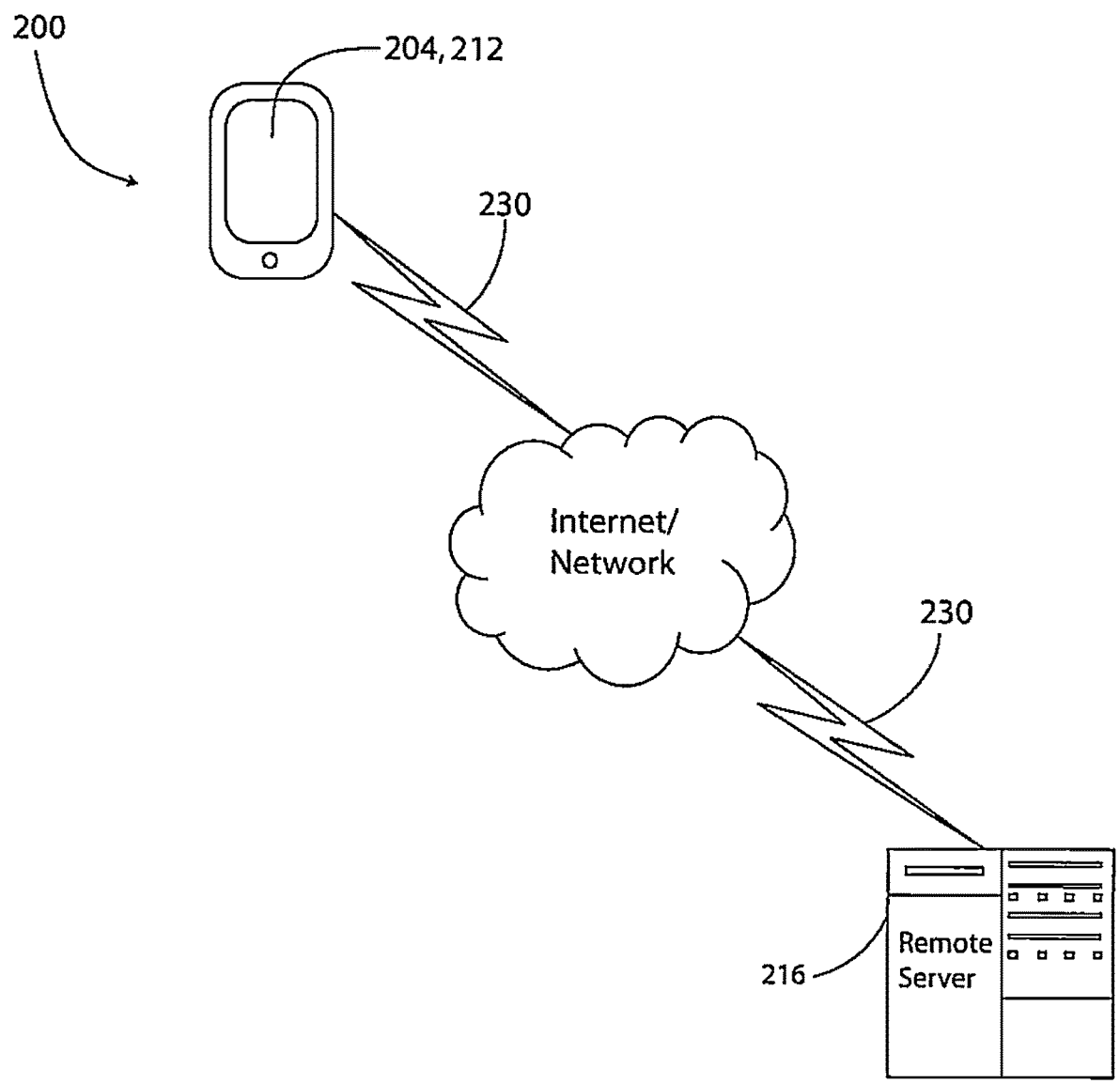
FIG. 2 is a diagrammatical view of a mobile communication terminal, in communication with external features, according to one or more aspects of the present invention.
Figure 2A:
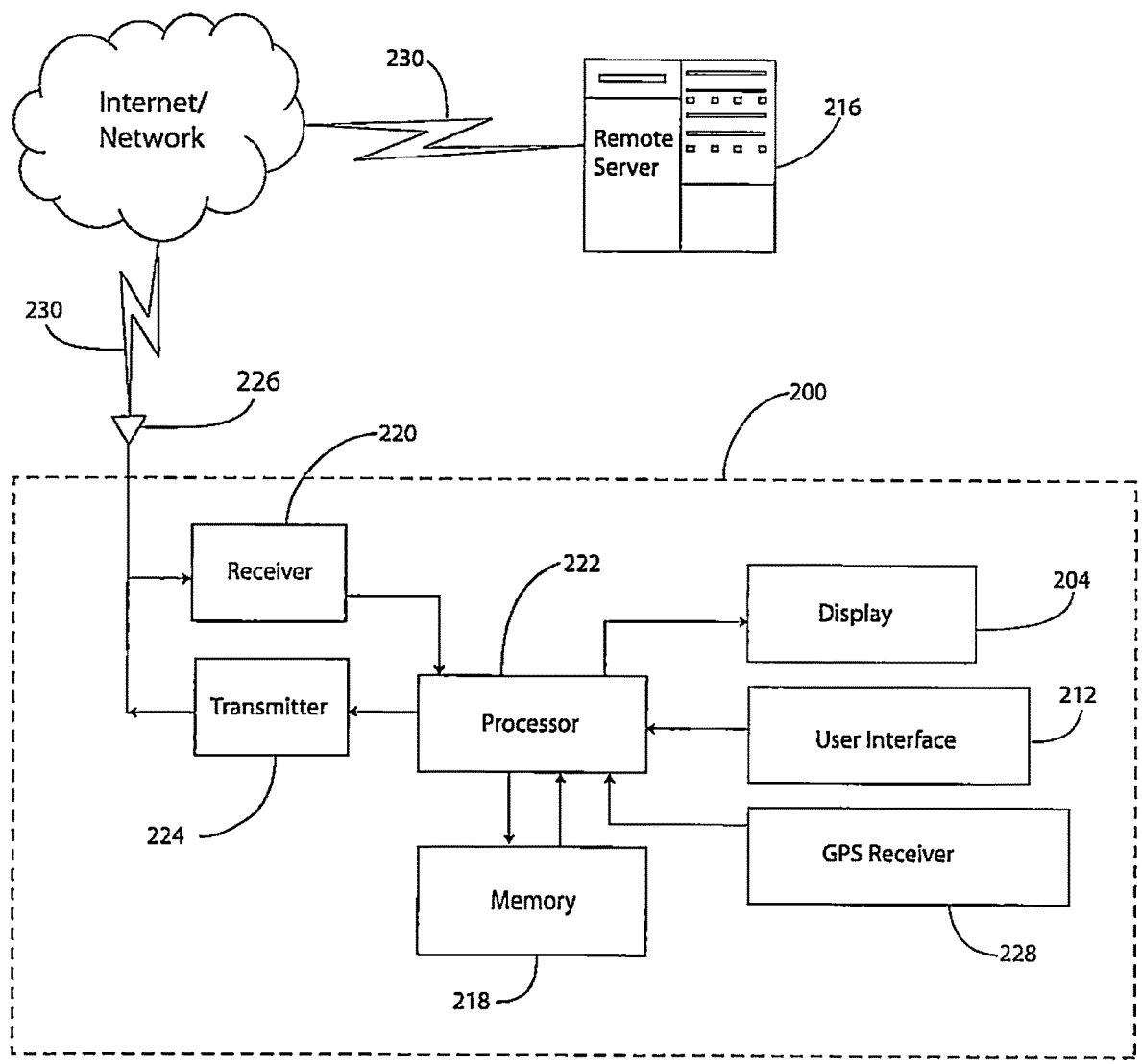
FIG. 2(a) is a schematic view of the mobile communication terminal of FIG. 2, in communication with external features, according to one or more aspects of the present invention.

Referring to FIG. 2 and FIG. 2(a), a mobile communication terminal 200 is shown. The mobile communication terminal 200 includes a hardware processor 222. The hardware processor 222 communicates with an electronic display 204, a user interface 212, a Global Positioning System (GPS) receiver 228, and a memory device 218. The electronic display 204 may comprise a liquid crystal display (LCD), a plasma display, a dot matrix display, a transreflective backlit display, or any other display technology that enables viewing of textual, graphical, and/or video information. The user interface 212 may comprise a touch screen interface overlaying, or incorporated into, the display 204 to allow the user to simply select displayed information by pressing on appropriate areas of the display 204 with a finger or supplied stylus. Alternatively, or in addition, the user interface 212 may include a keyboard, keypad, a touchpad, a speech-to-text converter in combination with a microphone, and/or any other means for selecting items or information displayed on the display 204 or entering information into the mobile communication terminal 200.

The processor 222 further communicates with a transmitter 224 and a receiver 220. The transmitter 224 and receiver 220 communicate with an antenna 226 for wirelessly transmitting data to, and receiving data from, the Internet and/or network of computing devices and/or other mobile communication terminals. Alternatively, the mobile communication device 200 may communicate with the Internet or other network through cabling or other connection device known in the art. The GPS receiver 228 is adapted to receive location data from a GPS satellite (not shown). The memory 218 includes a volatile memory device, a non-volatile memory device, or both. The memory device 218 may store software programs, such as any of the inventive programs described below, to be executed by the processor 222. Alternatively, software programs, such as any of the inventive programs described below, may be stored on a storage device associated with the remote server 216, to be executed by the processor 222 via a wireless communication link 230 and data communication by the transmitter 224 and the receiver 220.

The processor 222 utilizes conventional signal and data processing techniques to, inter alia, process signals received by the receiver 220 via a wireless communication link 230, generate signals to be transmitted by the transmitter 224 via the communication link 230, receive and process data, video and other information received from the user interface 212, the GPS receiver 228, and control the display of data, graphics, and video on the electronic display 204. The processor 222 comprises a microprocessor, a microcontroller, a digital signal processor (DSP), a state machine, logic circuitry, and/or any other device, or combination of devices, that processes information based on operational or programming instructions stored in a memory device, such as the memory device 218. One of ordinary skill in the art will appreciate that the processor 222 may comprise multiple processors as may be required to handle the processing requirements of the present invention.

Figure 3:
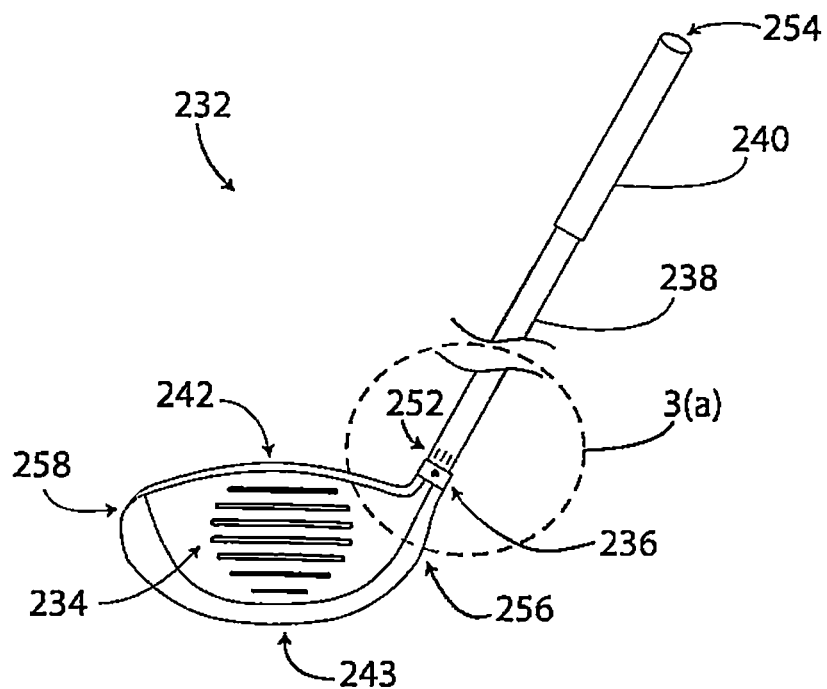
FIG. 3 is a front elevational view of a property-adjustable golf club, according to one or more aspects of the present invention.
Figure 3A:
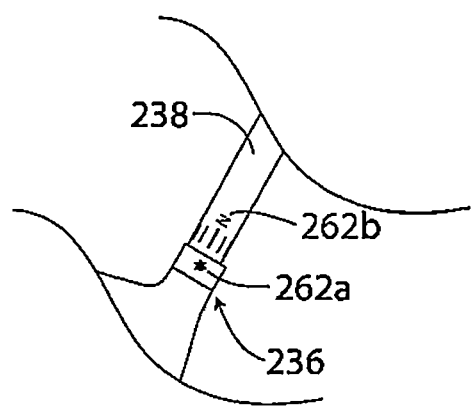
FIG. 3(a) is a detail of the property-adjustable golf club of FIG. 3.

Referring to FIGS. 3 and 3(a), an exemplary property-adjustable golf club 232, in accordance with the present invention, is shown. The golf club 232 includes a top portion 242, a bottom portion 243 opposite the top portion 242, a heel portion 256, and a toe portion 258 opposite the heel portion 256. The golf club 232 further includes a striking face 234 for hitting a golf ball, and a rear portion 260 opposite the striking face 234 (see FIG. 3(b)). The golf club head 232 further includes a hosel 236 extending from the top portion 242 proximate the heel portion 256, and a shaft 238 coupled to the hosel 236. The shaft includes a tip end 252 proximate the hosel 236 and a butt end 254 distal the hosel 236. A grip 240 is secured to the shaft 238 proximate the butt end 254.

Figure 3B:
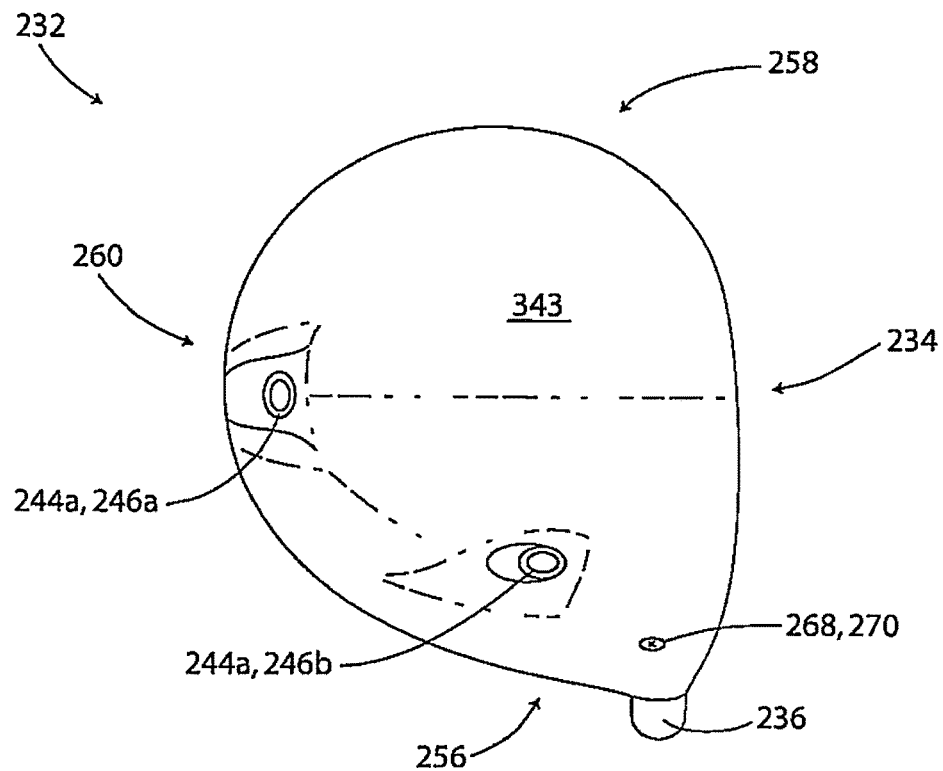
FIG. 3(b) is a bottom plan view of the property-adjustable golf club of FIG. 3.
Figure 3C:
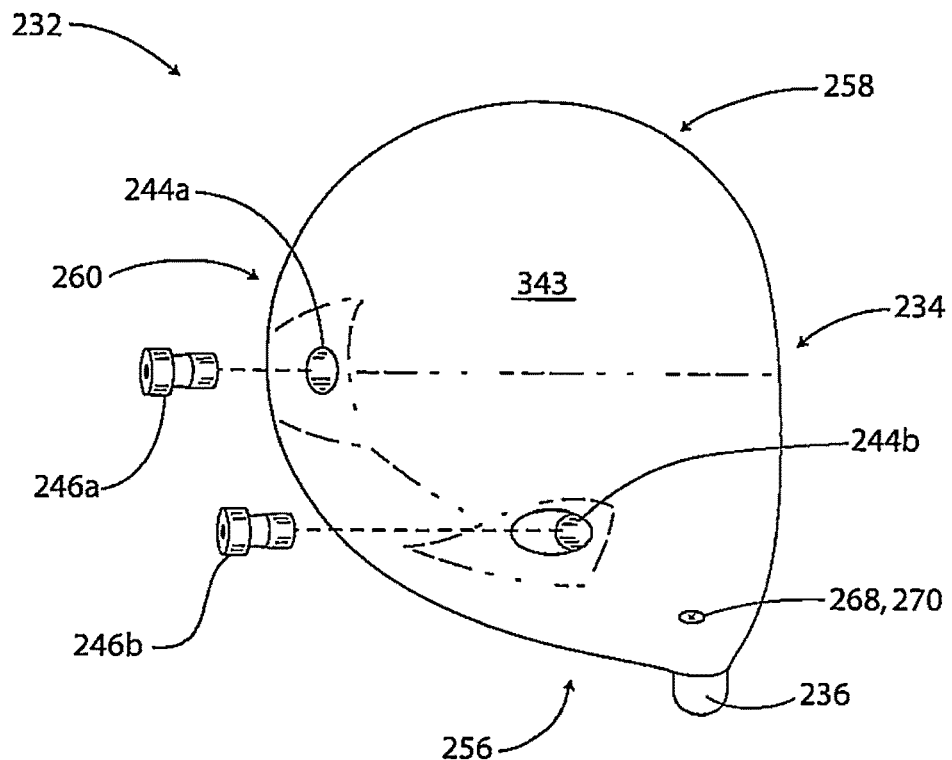
FIG. 3(c) is an exploded bottom plan view of the property-adjustable golf club of FIG. 3.
Figure 3D:
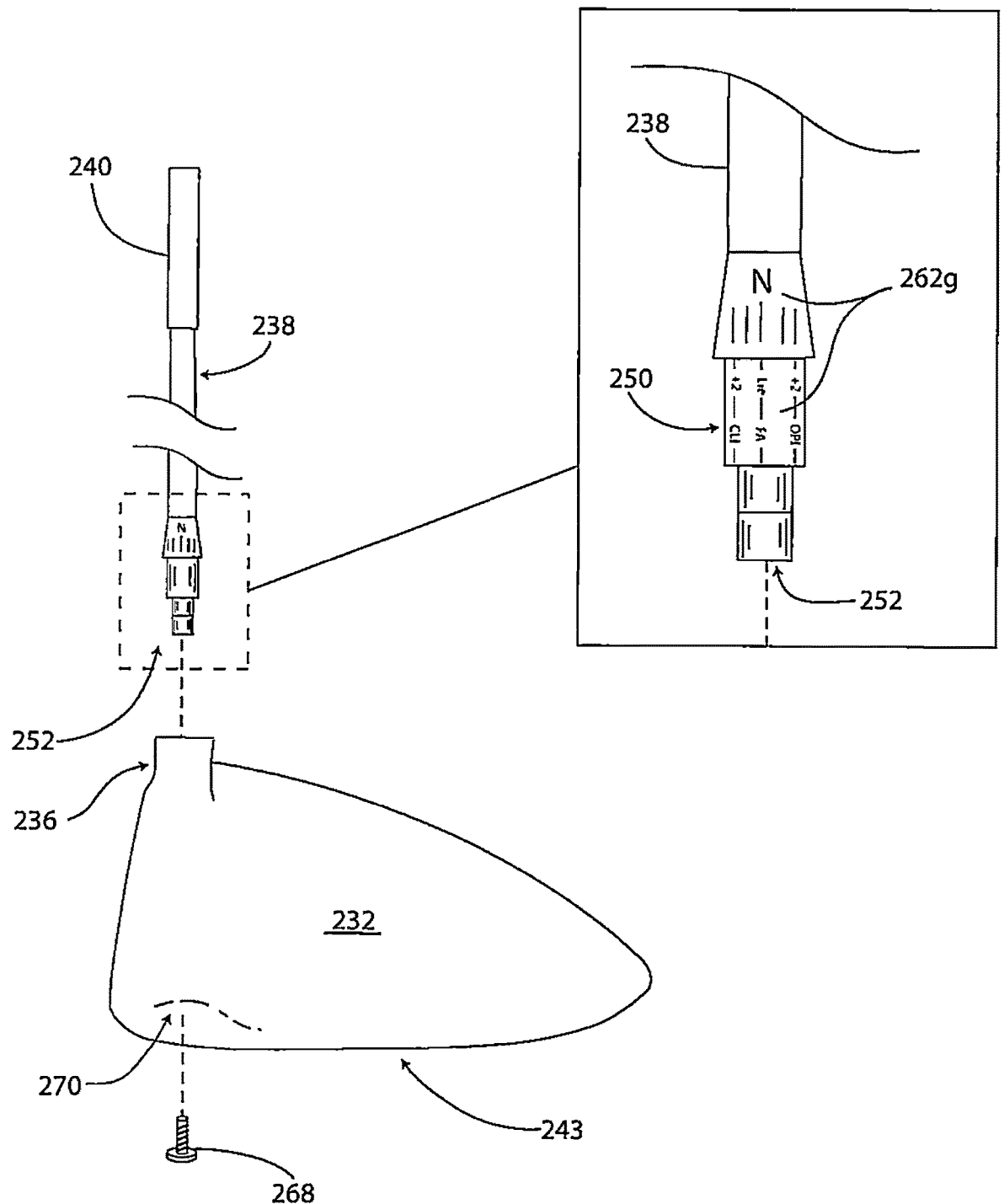
FIG. 3(d) is an exploded heel-side elevation view of the property-adjustable golf club of FIG. 3.

Referring to FIGS. 3(a) and 3(d), the shaft 238 is configured to be removably securable to the hosel 236. Specifically, the shaft 238 is attachable to the hosel 236 in any of twelve different positions. Each position corresponds to a unique combination of lie angle and face angle of the golf club 232. In alternative aspects of the present invention, the shaft 238 is attachable to the hosel in more than, or less than, twelve positions. Alternatively, the positions correspond only to unique golf club face angles, while lie angle is constant, or correspond to unique golf club lie angles, while face angle is constant. Alternatively, or in addition, the golf club is adapted such that a loft angle is modifiable.

A fastener 268 is insertable through an aperture 270 extending from the bottom portion 243 of the golf club 232 into an inner bore space of the hosel 236. The tip 250 of the shaft 238 includes a threaded aperture (not shown) for receiving the fastener 268. In some aspects of the present invention, the tip 250 of the shaft 238 further includes ridges, or fluted recesses, extending in the axial direction of the shaft and positioned about the circumference of the shaft 238 for securing proper placement of the shaft 238 within the hosel 236. The hosel 236 may include an inner surface (not shown) having geometry complementary with the tip end 252 of the shaft 238 such that, when the shaft 238 is inserted into the hosel 236, rotational movement of the tip 250 is limited. The position of the shaft 238 is secured by tightening the fastener 268. In some aspects of the present invention, a fastening tool is provided to appropriately secure the position of the shaft 238. Such a tool may comprise a conventional screw driver, wrench, allen wrench, allen key, torx wrench, a wrench having a polygonal cross-section, a wrench having a proprietary cross-sectional shape, or the like. In one or more aspects of the present invention, the fastening tool includes a torque-sensing device and, optionally, an indicator for indicating, to the user, the current torque being applied to the fastener and/or when a threshold torque has been reached or exceeded.

As shown in FIG. 3(a), indicator indicia 262a is provided on the hosel portion 236 of the golf club 232. A second set of indicia 262b is provided proximate the tip end 252 of the shaft 238. The second set of indicia 262b includes a series of incremented marks, representing lie angle offset values and face angle offset values. The alignment of the second set of indicia 262b and the indicator indicia 262a is indicative of the position of the shaft 238. Adjustment of the lie angle and the face angle is enabled by the shaft having a shaft axis that is radially offset from a hosel axis. This shaft 238 and hosel 236 configuration constitutes a non-deformative property-adjustment feature. A "non-deformative property-adjustment feature," as used herein, denotes a feature of a golf club, e.g. golf club 232, that enables modification of a property of the golf club without resulting in appreciable plastic deformation of any portion of the golf club.

Referring to FIGS. 3(b) and 3(c), a first weight port 244a is located proximate the rear portion 260 of the golf club 232. A second weight port 244b is located proximate the heel portion 256 of the golf club 232. Weight elements 246a and 246b are configured to be removably securable within the first weight port 244a and the second weight port 244b, respectively. Specifically, the weight elements 246a and 246b include threaded portions such that the weight elements 246a and 246b may be secured to corresponding threaded portions of the weight ports 244a and 244b using a fastening tool such as a conventional screw driver, wrench, allen wrench, allen key, or the like. In one or more aspects of the present invention, the fastening tool includes a torque-sensing device and, optionally, an indicator for indicating, to the user, the current torque being applied to the fastener or when a threshold torque has been reached or exceeded. The combination of weight ports and corresponding removable weights constitutes a non-deformative property-adjustment feature of the golf club 232.

In one or more aspects of the present invention, a user may select weight elements to secure within each of the first weight port 244a and the second weight port 244b from a kit of weight elements. In some aspects of the present invention, the kit includes weight elements having masses of 3 grams, 7 grams, 7 grams, and 11 grams. In alternative aspects of the present invention, the kit includes fewer, or more, weight elements. Alternatively, or in addition, the kit includes weight elements of different masses.

One of ordinary skill in the art would appreciate that such adjustable features may be incorporated into the design of other types of golf clubs, such as putter-type golf clubs, iron-type golf clubs including wedge-type golf clubs, and hybrid-type golf clubs. Additionally, one of ordinary skill in the art would appreciate that additional, or alternative, property-adjustable features may be incorporated into the design of the golf club 232, including a repositionable or interchangeable sole or sole plate, optionally for enabling a golf club head to have different face angles when oriented in an address position, a variable stiffness striking face, a shaft repositionable in one of a plurality of discrete locations, a removable striking face, and a removable top portion or crown.

In one or more aspects of the present invention, a user-interactive software program is embodied on computer-readable medium, e.g. memory 218, for assisting a user in selecting a golf club, or golf product, or assisting a user in reconfiguring a property-adjustable golf club, e.g. property-adjustable golf club 232. For clarity, software programs, related methods, and systems will be described with regard to the mobile communication terminal 200 shown in FIGS. 2 and 2(a) and in view of the property-adjustable golf club 232 shown in FIG. 3. One of ordinary skill in the art would appreciate that such software programs, methods, and systems may also be carried out by like features of the computing device 100, as shown in FIGS. 1 and 1(a), or other computing device known in the art, having similar features, and in view of other golf clubs having similar adjustable properties or alternative adjustable properties known in the art.

In one or more aspects of the present invention, a software program for assisting a golfer in reconfiguring a property-adjustable golf club is stored in the memory 218 of the mobile communication terminal 200. In one or more alternative aspects of the present invention, the software program is stored on a computer-readable storage device associated with the remote server 216, which is accessed by the processor 222 through the transmitter 224 and the receiver 220 and, in some aspects, using a conventional web browser. The relative order of the various steps of one or more of the following inventive processes are for purposes of exemplification. One of ordinary skill in the art would appreciate that various steps of one or more of the following inventive processes may be omitted, or the relative order of such steps may be altered without departing from the spirit and scope of the invention.

Figure 4:
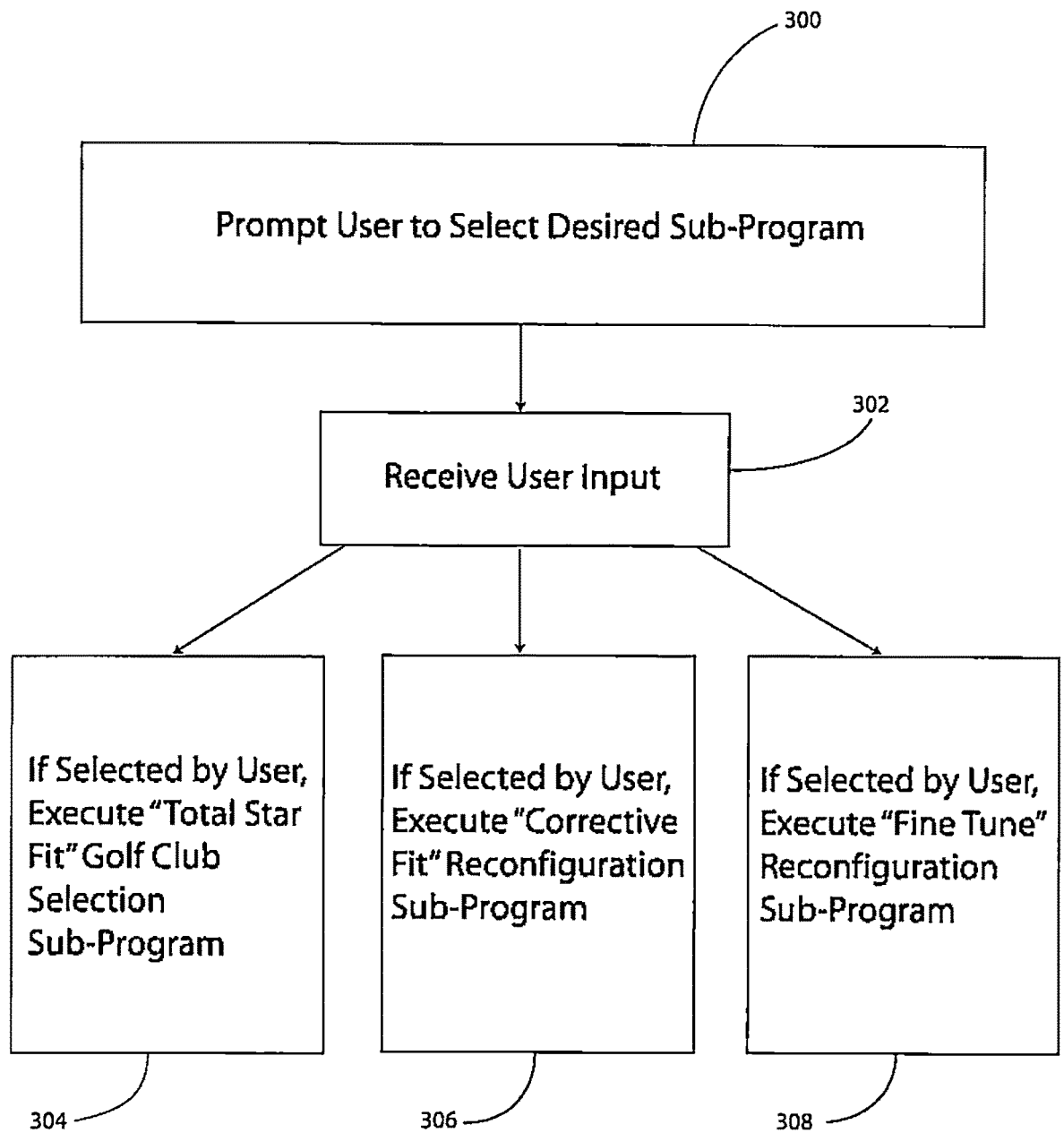
FIG. 4 is a flowchart exemplifying a golf club fitting process, according to one or more aspects of the present invention.
Figure 4A:
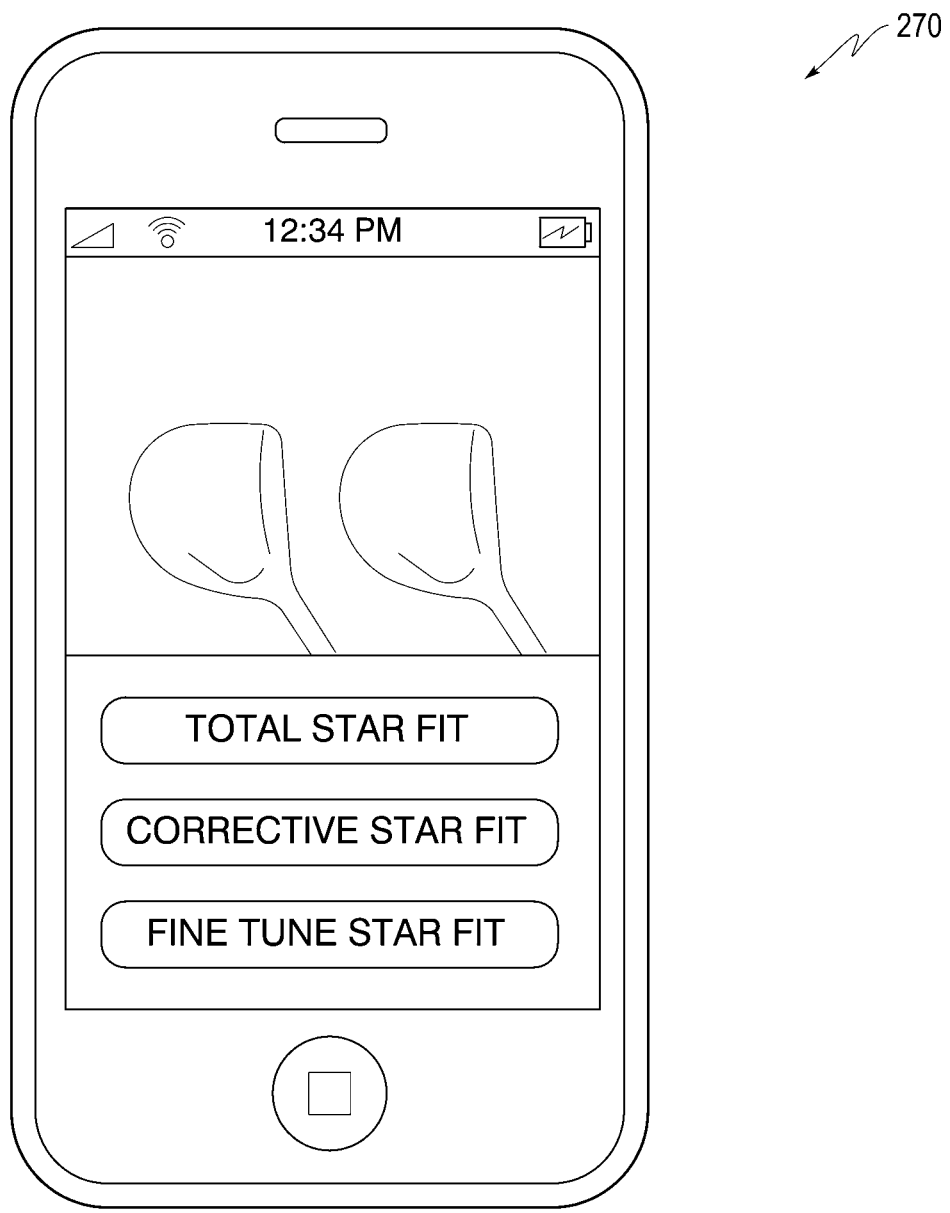
FIG. 4(a) illustrates a screen shot displayed to a user during the execution of the golf club fitting process of FIG. 4.

Referring to FIG. 4, in one or more aspects of the present invention, a software program, when executed by the processor 222, causes the processor 222 to display a graphical user interface (GUI) on the display 204, exemplified by a screen shot 270 shown in FIG. 4(a). The GUI prompts a user to select a sub-program from one or more fitting sub-programs. Such sub-programs include one or more of: (a) a golf club selection sub-program for assisting the user in selecting a golf club, or component thereof, from among a plurality of distinct golf clubs, or components thereof, and, optionally, configuring the golf club to the needs of the user (e.g. "TOTAL STAR FIT," as shown in the screen shot 270 of FIG. 4(a)); (b) a corrective golf club reconfiguration sub-program for assisting a user in performing a reconfiguration, preferably a non-deformative reconfiguration, of a property-adjustable golf club (e.g. "CORRECTIVE STAR FIT," as displayed in the screen shot 270 of FIG. 4(a)); (c) a fine-tuning golf club reconfiguration sub-program for assisting the user in performing an adjustment to a property-adjustable golf club, limited to fine adjustment (e.g. "FINE TUNE STAR FIT," as shown in the screen shot 270 of FIG. 4(a)); and (d) a golf ball, or other golf product, selection sub-program, for assisting the user in selecting a golf ball, or golf product. The user then selects the desired sub-program to be executed, using the user interface 212, whereupon the desired sub-program is executed. One or more of these sub-programs will be further discussed below.

One or more of the programs, methods, and systems discussed below include the transfer of data corresponding to actual information. Such information may be variously classified into information types defined as follows:

"Base golf club, or golf product, information," as used herein, denotes information pertaining to one or more aspects of a golf club, or golf product, that the user desires to modify or use as a basis for selecting a new golf club, golf product, or component thereof. Examples of base golf club, or golf product, information include relative or absolute values of: loft angle, lie angle, face angle, club head weight, total club weight, shaft flex, coefficient of restitution, position of a repositionable sole plate, the relative or absolute weight of a removable weight element, and the position of a repositionable shaft. Base golf club information may also include the identity of a golf club, or component thereof, and/or information pertaining to factory settings of a specified golf club, or a component thereof.

"Trajectory adjustment information," as used herein, denotes information pertaining to the performance, or feel, of a golf club or golf product. Examples of "trajectory adjustment information" include absolute or relative values of: current ball flight distance, desired ball flight distance, a difference between a current and a desired ball flight distance, a current degree of fade or draw of a hit golf ball, a desired degree of fade or draw, a difference between a current and a desired degree of fade or draw, a current ball spin value, a desired ball spin value, a difference between a current and a desired ball spin value, a current trajectory height, a desired trajectory height, a difference between a current and a desired trajectory height, or a default setting representing an optimal value of any of the aforementioned values. Trajectory adjustment information may also include aspects of the vibratory waves emanating from a golf club upon striking a golf ball, including aspects characterizing the sound produced by the golf club and/or vibrations felt by the golfer.

"Environmental information," as used herein, denotes information pertaining to aspects extrinsic to a golf club, or golf product, which a user desires to reconfigure or select from amongst a plurality of distinct golf clubs or golf products, understood to have an effect on the performance of the golf club, or golf product. Examples of environmental information include absolute or relative values of: elevation, weather conditions, and course conditions. Weather conditions may include absolute or relative values of: temperature, average wind speed, a type and/or degree precipitation, degree of cloud cover, and wind direction. Course conditions may include absolute or relative values of: a degree of wetness of a course, a degree of hardness of the fairway, and a degree of narrowness of one or more fairways. For a program adapted to enable a user to select or reconfigure a golf club or component thereof, aspects of the golf ball that the user employs constitutes environmental information. Similarly, for a program adapted to enable a user to select a golf ball, aspects of the user's current golf club or component thereof constitutes environmental information.

Figure 5:
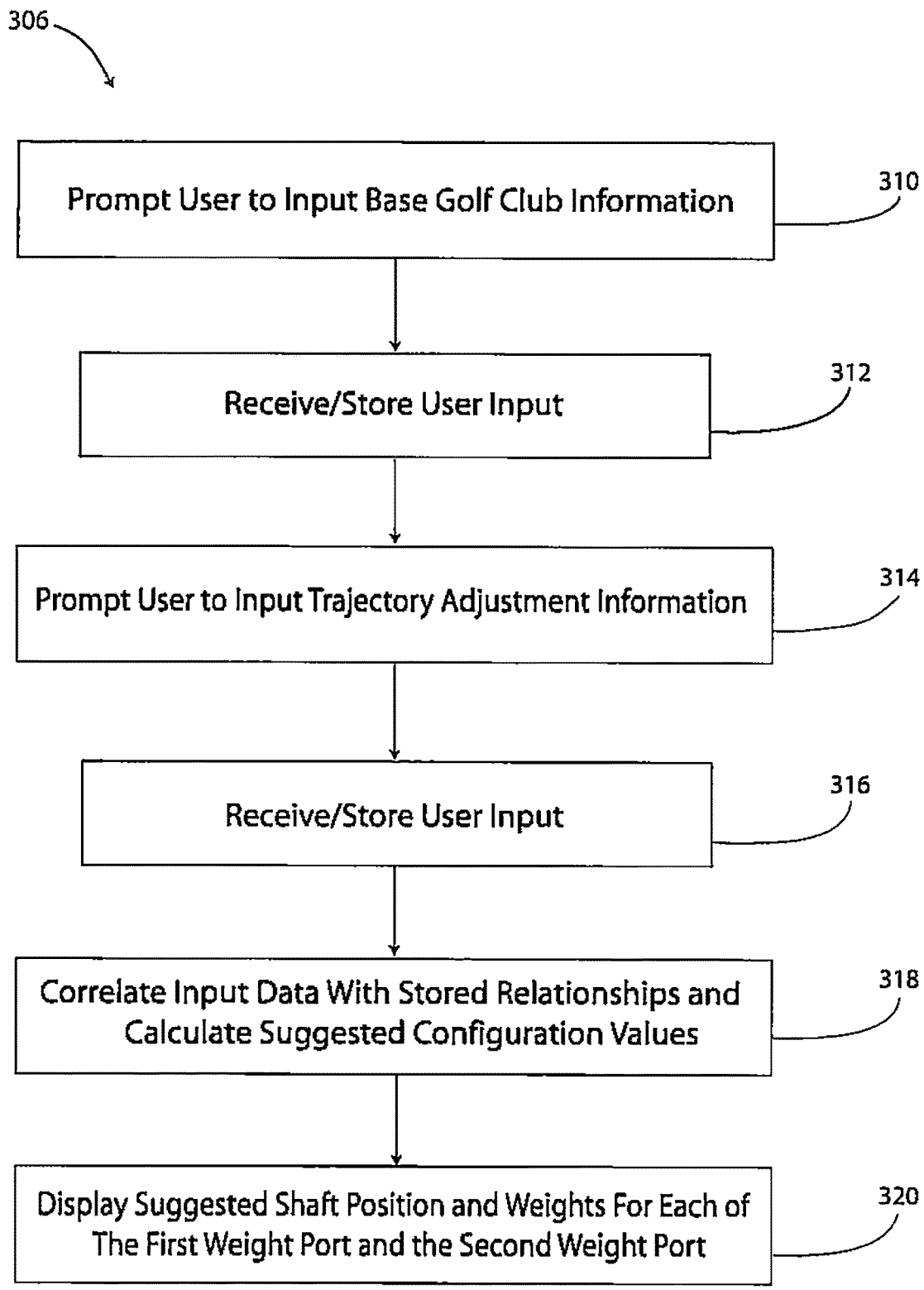
FIG. 5 is a flowchart exemplifying a sub-process of the golf-club fitting process of FIG. 4.
Figure 5A:
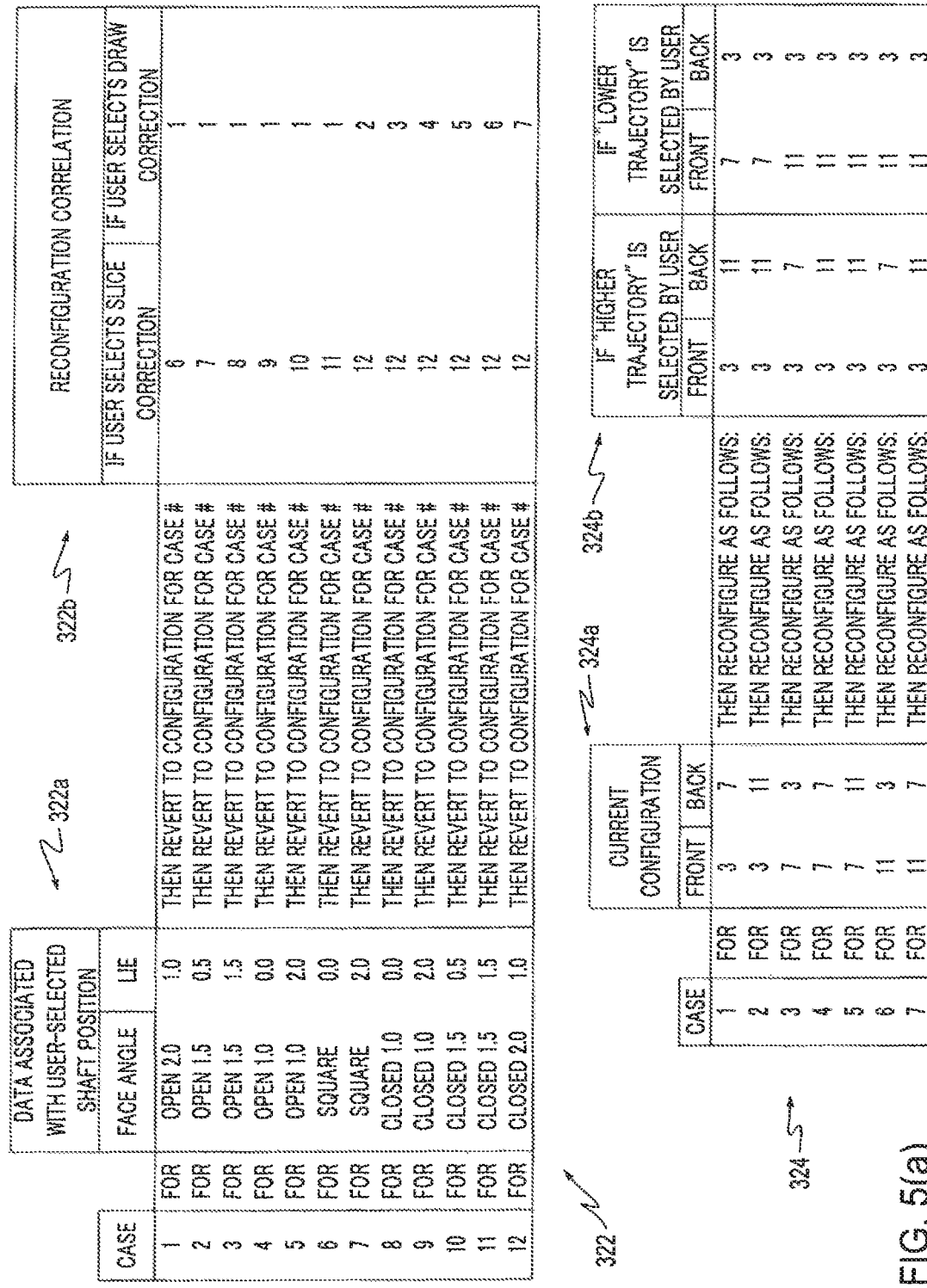
FIG. 5(a) illustrates various logic-enabled databases for use in conjunction with the golf-club fitting process of FIG. 4.
Figure 5B:
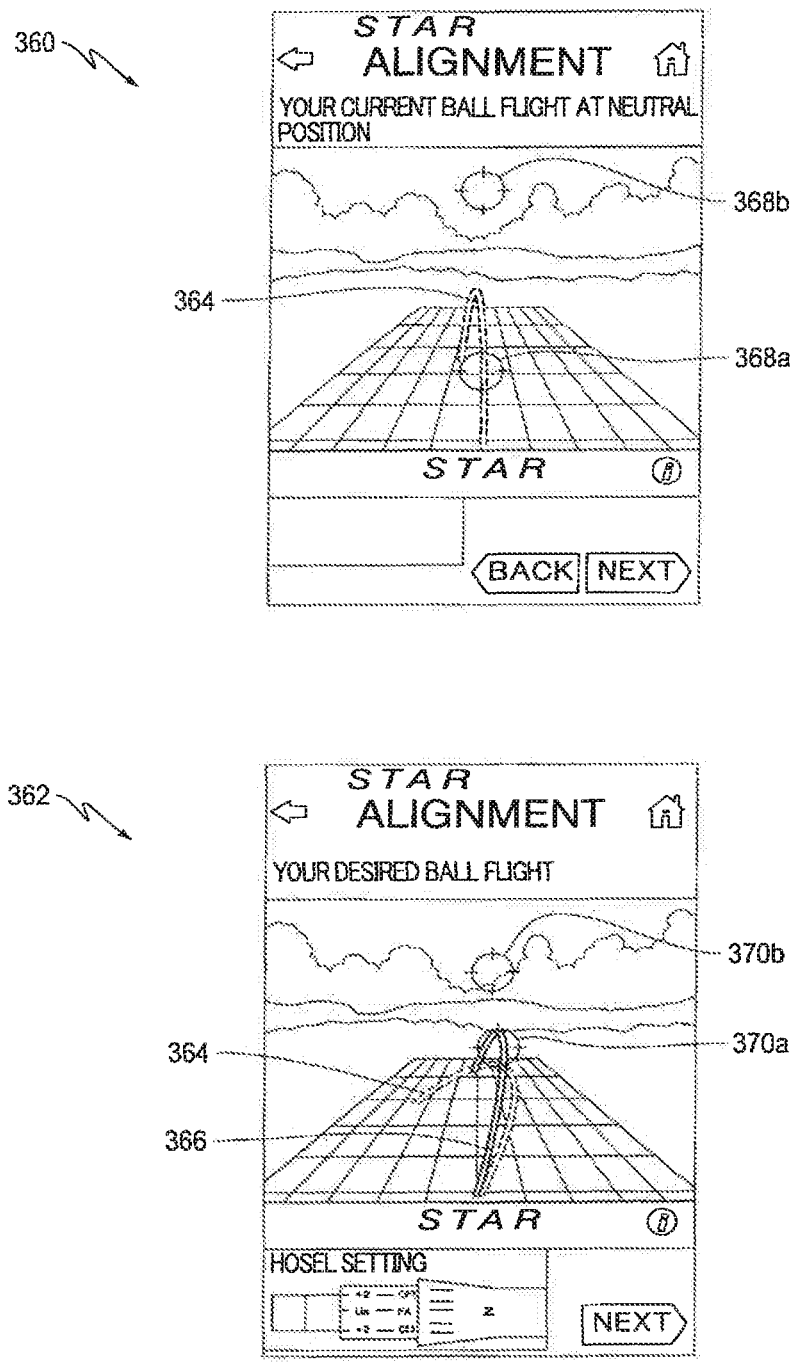
FIG. 5(b) illustrates various screen shots displayed to a user at various points during the execution of the golf-club fitting process of FIG. 4.

Referring to FIG. 5, in one or more aspects of the present invention, the corrective fit sub-program 306 is shown in detail. This sub-program 306 assists a user in performing a corrective reconfiguration of the property-adjustable golf club 232, when executed by the processor 222 of the mobile communication terminal 200. In one or more alternative aspects of the present invention, the sub-program 306, when executed, assists a user in performing a corrective reconfiguration of a different golf club having like adjustable properties, or any other adjustable properties known in the art. Alternatively, or in addition, the sub-program 306, when executed, permits the golfer to select a golf club, from amongst a library of golf clubs, which to execute the program in view of. In this aspect, based on the user selection of golf club, the processor 222 will retrieve, from storage, data pertaining to the selected golf club, from amongst data that variously pertain to each golf club of the library of golf clubs.

In step 310 and 312, a first GUI is presented on the display 204 prompting the user to input base golf club information. Specifically, the first GUI prompts the user to input a value corresponding to the mass of each removable weight element 246a and 246b in each of the first weight port 244a and the second weight port 244b (see FIG. 3(*a*)) from a selection of 3 grams, 7 grams, and 11 grams. A first user input is received and stored. A second GUI is then displayed prompting the user to select a current position of the shaft, from amongst a plurality of possible shaft positions. Specifically, the GUI prompts the user to select a first value corresponding to a lie angle and a second value corresponding to a face angle. A second user input is received and stored.

In some aspects of the present invention, a GUI further prompts the user to input information pertaining to current shaft characteristics, such as flex, from amongst a selection of possible shaft flexes, e.g. "A-FLEX," "REGULAR," "STIFF," and "X-STIFF." In some aspects of the present invention, a GUI further prompts the user to input a loft angle of the user's current golf club. In alternative aspects of the present invention, some or all user inputs corresponding to base golf club information are prompted on a single GUI. In some aspects of the present invention, additional base golf club information is requested, such as any of the additional exemplified base golf club information discussed above. The result is retrieved by the processor 222 and stored in memory 218.

In step 314 and 316, trajectory adjustment information is requested and received from the user, and stored in memory. Specifically, in some aspects, a GUI prompts the user to select between "Get rid of slice" and "Get rid of draw." The user-inputted result is then retrieved and stored in memory 218.

In step 318, the sub-program 306 causes the processor 222 to correlate the input data with one or more stored logic-enabled databases that include logic relationships between potential input data and potential reconfiguration information as shown in FIG. 5(*a*). Specifically, the first logic-enabled database 322 includes relationships between potential user input of base golf club information 322a (e.g. "data associated with user-selected shaft position," subdivided into "face angle" and "lie"), trajectory adjustment information 322b (e.g. "reconfiguration correlation," subdivided into "if user selects slice correction" and "if user selects draw correction"), and potential reconfiguration information (e.g. a suggested adjustment of shaft position that includes a face angle value and a lie angle value).

As an example of operation, a user indicates that his/her current shaft position includes a face angle that is 1.0 degrees open and a lie angle that is 2.0 degrees above a factory-set lie angle. The user further indicates a desire to correct a slice. Based on such input, the processor 222, using the database 322, infers that the user's desired configuration corresponds to that of case #10, namely a shaft position including a face angle that is 1.5 degrees closed and a lie angle that is 0.5 degrees below the factory-set lie angle.

The second logic-enabled database 324 stores additional relationships between potential user input of base golf club information 324a, trajectory adjustment information 324b, and reconfiguration information. In this database 324, base golf club information includes the mass values of weight elements that are currently positioned in each of the first weight port 244a (i.e. "back" weight port) and the second weight port 244b (i.e. "front" weight port) of the user's golf club. The trajectory adjustment information 324b includes whether the user desires a higher trajectory or whether the user desires a lower trajectory. The reconfiguration data includes desired mass values to assist the user in choosing weight elements to associate with each of the first weight port 244a and the second weight port 244b.

As an example of operation, the user indicates a current weight element configuration that includes a 7 gram weight element associated with the "front" weight port and a 3 gram weight element associated with the "back" weight port. The user further indicates a desire for a "lower trajectory." Based on the user-input information, the processor, using database 324, infers that the user's desired weight element configuration includes an 11 gram weight element associated with the "front" weight port, and a 3 gram weight element associated with the "back" weight port.

In alternative aspects of the present invention, the prompting and receiving of trajectory adjustment information, as in steps 314 and 316, is carried out by providing a first GUI 360 and a second GUI 362 (see FIG. 5(*b*)) that enable the user to select current and desired shot trajectories by manipulating a first visualization of a trajectory shape 364 and a second visualization of a trajectory shape 366, respectively. Specifically, the first GUI 360 prompts the user to manipulate the first visualization of a trajectory shape 364 by selecting, via relocating positions of a plurality of cross-hair markers 368a and 368b, a degree of peak height of the current shot trajectory, a degree of current shot distance, and a degree of current slice or hook corresponding to the user's current shot shape. The second GUI 362 prompts the user to manipulate the second visualization of a trajectory shape by selecting, via relocating positions of a plurality of cross-hair markers 370a and 370b, a degree of desired shot distance, a degree of desired slice or hook, and a degree of desired peak height that correspond to the user's desired trajectory shape. The results are retrieved and stored in memory, e.g. memory 218.

In some aspects of the present invention, the above sub-program 306 includes instructions for the processor 222 to determine, based on the user-selected cross-hair marker locations for each of the current and desired trajectory shapes, reconfiguration information to assist the golfer in modifying his or her golf club for enhanced performance. Specifically, in some aspects of the present invention, the sub-program 306 instructs the processor 222 to infer reconfiguration information based solely on the data received from the user interaction with the GUIs 360 and 362.

For example, in some aspects, using GUI 360, the user confirms the location of each of the cross-hair markers 368a and 368b. Then, for the locations of each of the cross-hair markers 368a and 368b (i.e. current trajectory shape), a horizontal (i.e. x-coordinate) value is stored in memory and a vertical (i.e. y-coordinate) value is stored in memory, whereby the origin of the coordinate system is at the bottom-most left-most corner of the display screen. Next, using GUI 362, the user confirms locations of each of the cross-hair markers 370a and 370b. For the locations of each of the cross-hair markers 370a and 370b (i.e. desired trajectory shape), a horizontal (i.e. x-coordinate) value is stored in memory and a vertical (i.e. y-coordinate) value is stored in memory, whereby the origin of the coordinate system is at the bottom-most left-most corner of the display screen. Next, the processor 222 determines a horizontal trajectory correction value by differencing the x-coordinate values of the locations of the cross-hair markers 370a and 368a, and determines a vertical trajectory correction value by differencing the y-coordinate values of the locations of the cross-hair markers 370b and 368b.

In some aspects, based on the horizontal trajectory correction value, the processor 222 determines whether the user desires either a fade correction or a draw correction. For example, the sub-program instructs the processor 222 to infer a fade correction if the horizontal correction value (i.e. the x value of the cross-hair marker 368a location minus the x value of the cross-hair marker 370a location) is positive, and to infer a draw correction if the horizontal correction value is positive. Based on this inference, in some aspects, a first reconfiguration value (e.g. a value corresponding to a suggested shaft orientation) is outputted to the display 204 if a fade correction is inferred, and a second different reconfiguration value is outputted to the display 204 if a draw correction is inferred.

Similarly, in some aspects, the processor 222 determines whether the user desires either an increase in trajectory peak height or a decrease in trajectory peak height. Specifically, the sub-program 306 instructs the processor 222 to infer a first trajectory peak height correction value corresponding to a desired decrease in trajectory peak height if the vertical correction value (i.e. the y value of the cross-hair marker 370b location minus the y value of the first cross-hair 368b location) is negative, and to infer a second trajectory peak height correction value corresponding to a desired increase in trajectory peak height if the vertical correction value is positive. Based on this inference, a third reconfiguration value is outputted to the display 204 if a desired decrease in trajectory peak height is inferred and a fourth different reconfiguration value is outputted to the display 204 if a desired increase in trajectory peak height is inferred.

In other aspects of the present invention, however, the sub-program 306 instructs the processor 222 to infer, as reconfiguration information, a value corresponding to a relative degree of trajectory adjustment (e.g. fade/draw correction and trajectory peak height correction) from among a range of potential trajectory adjustment values, based on the vertical correction value and the horizontal correction value. Alternatively, or in addition, the processor 222 infers reconfiguration information on the combined basis of the horizontal correction value and the vertical correction value. This case is advantageous in that shaft adjustment generally affects both lie angle and face angle simultaneous. Further, adjustment of a single parameter, e.g. lie angle, may affect both trajectory peak height and fade/draw characteristics of trajectory.

In some aspects of the present invention, the sub-program instructs the processor to determine reconfiguration information based on the data received from the user interaction with the GUIs 360 and 362 in combination with data previously received and/or data to be received in a subsequent process of the sub-program. For example, in such aspects of the present invention, the processor 222 is adapted to infer reconfiguration information on the basis of the horizontal and vertical correction values in combination with data corresponding to the user's current golf club configuration, current golf club properties, and/or environmental information such as weather conditions optionally including average wind speed, and/or course conditions such as turf hardness. Such inference is to be carried out in accordance with predetermined relationships in the form of stored algorithms, logic-enabled databases, or the like.

In some aspects of the present invention, the steps of prompting the user to input trajectory adjustment information 314 and storing such information 316 further includes prompting the user to input responsiveness information and storing the responsiveness information. In such aspects of the present invention, a GUI displays text and/or graphics prompting the user to select values representing various characteristics of feel. Specifically, the display prompts the user to select a "swingweight" value from amongst a plurality of selectable swingweight values. The displayed GUI, in some aspects, informs the user that lower "swingweight" values correspond to a lighter and faster shaft feel, and higher "swingweight" values correspond to the golf club having a weighty feel. Additionally, the displayed GUI prompts the user to select a trajectory height value from amongst a plurality of values ranging from "low" to "high." Finally, the display prompts the user to select a playability value from amongst a plurality of playability values ranging from "stable and straight" to "workable." Resulting user-inputted values are then received and stored in the memory 218.

Alternatively, or in addition, the software program instructs the processor to relate user-input information to output information, e.g. reconfiguration information, by using one or more mathematic algorithms, or other logic structures known in the art. In some aspects of the present invention, logic structures governing the relationship between user-input information and reconfiguration information may include logic that relates a plurality of user input values to a single reconfiguration value, or relates a single user input value with a plurality of reconfiguration values.

Based on any of the above determinations of reconfiguration information, the processor 222, in step 320, causes the display 204 to display one or more values corresponding to reconfiguration information. From this displayed information, the user is able to appropriately reconfigure the golf club 232 in a manner that improves the performance of the golf club 232 for that user.

The user input information and the output reconfiguration information is not limited to those provided in the first database 322 and the second database 324. Similarly, the logic relationships between such input information, trajectory adjustment information, environmental information, and reconfiguration information is not limited to the logical relationships shown in the first database 322 and the second database 324. Thus, in alternative aspects of the present invention, other base golf club configuration information, trajectory adjustment information, and environmental information described above, and/or any additional base golf club configuration information, trajectory adjustment information, and environmental information is used. Empirical methods, computational methods, and/or the like, may then be carried out to establish appropriate relationships governing such alternative, or additional, information. Alternatively, or in addition, the sub-program 306, when executed, causes the first GUI to provide a "factory settings" selection. If selected by the user, the processor 222 will base determinations of output reconfiguration information on stored factory-set information associated with the golf club 232.

Figure 6:
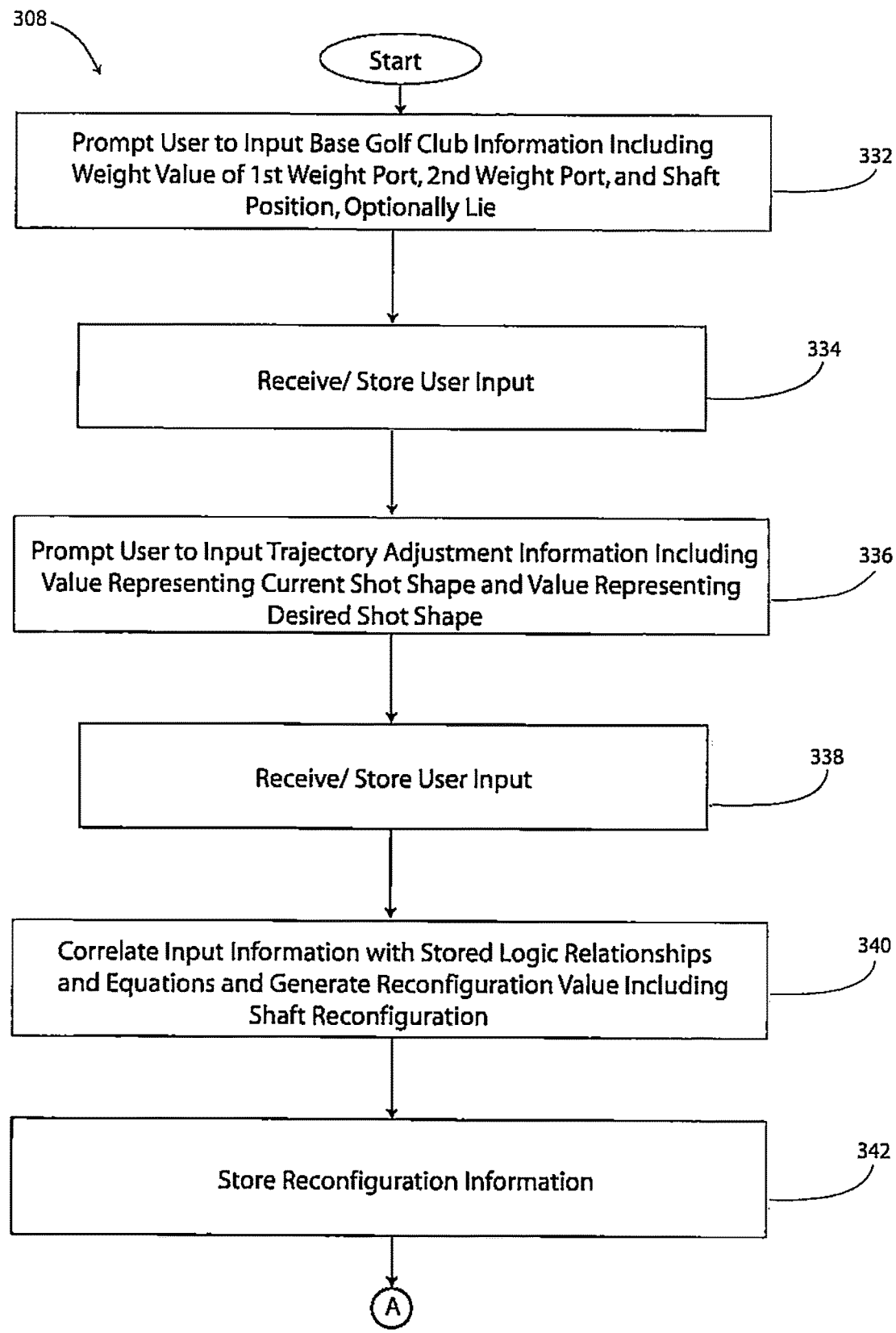
FIG. 6 is a flowchart exemplifying a sub-process of the golf-club fitting process of FIG. 4.

Referring to FIG. 6, in one or more aspects of the present invention, the fine-tune fitting sub-program 308 is shown in detail. This sub-program 308 assists a user in performing a last-minute reconfiguration of the property-adjustable golf club 232, when executed by the processor 222 of the mobile communication terminal 200. In one or more alternative aspects of the present invention, the sub-program 308, when executed, assists a user in performing a fine-tune reconfiguration of a different golf club having like adjustable properties, or other adjustable properties known in the art. Alternatively, or in addition, the sub-program 308, when executed, permits the golfer to select a golf club, from a library of golf clubs, in view of which to execute the sub-program 308. In these aspects of the present invention, based on the user selection of a golf club, the processor 222 will selectively use base golf club information pertaining to the selected golf club from amongst data, stored on the memory 218 and/or a memory associated with the remote server 216, that variously pertains to each golf club of the library of golf clubs.

Referring again to FIG. 6, in steps 332 and 334, base golf club information is requested and received from a user and stored. Specifically, a first GUI 272 (see FIG. 6(d)) is presented on the display 204 prompting the user to input base golf club information. Specifically, the first GUI 272 prompts the user to select a first mass value corresponding to the removable weight element 246a that is currently associated with the first weight port 244a (i.e. "rear weight") from amongst a selection of 3 grams, 7 grams, and 11 grams, and a second mass value corresponding to the removable weight element 246b that is currently associated with the second weight port 244b (i.e. "forward weight") from amongst a selection of 3 grams, 7 grams, and 11 grams (see FIG. 6(d)). A first user input is received and stored. A second GUI 274 is then displayed prompting the user to select a current shaft position from amongst a plurality of possible shaft positions of the golf club 232 (see FIG. 6(d)). A second user input is received and stored. In alternative aspects of the present invention, the first and second GUIs 272 and 274 display previously-entered base golf club information and/or default base golf club information, whereupon the user is prompted to confirm such settings or modify such base golf club information to reflect the golfer's current golf club configuration.

In steps 336 and 338, trajectory adjustment information is requested and received from the user, and stored. Specifically, a third GUI 276 is displayed (see FIG. 6(d)) enabling the user to select a value representing a current shot shape chosen from amongst twelve incremented values representing shot shapes of various degrees of fade or draw, ranging from −5 to +6. Negative values represent draw shots and positive values represent fade shots. The user-inputted selection is received and stored.

Figure 6A:
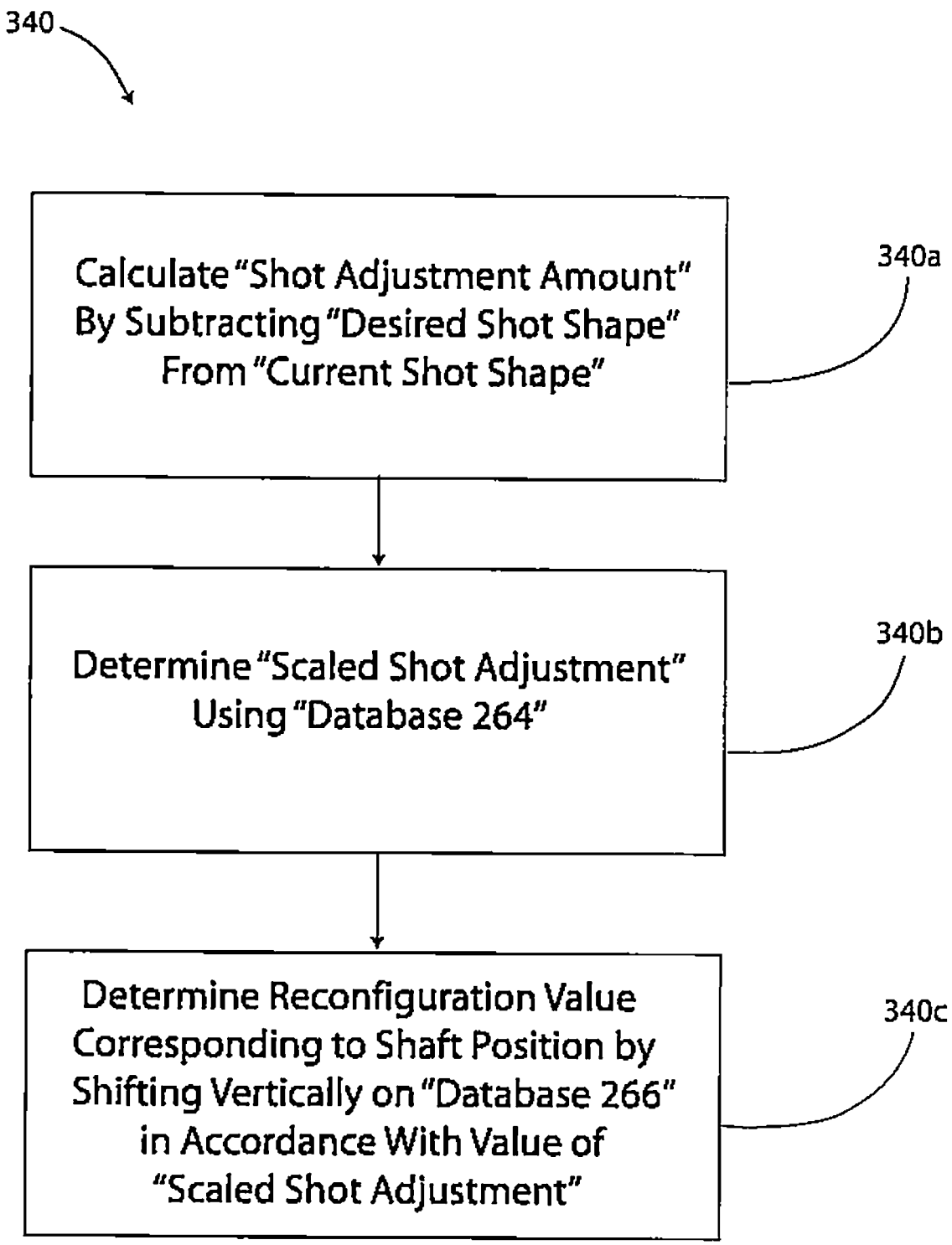
FIG. 6(a) is a flowchart showing further detail of step 340 of the sub-process of FIG. 6.

Referring to FIGS. 6 and 6(a), in step 340 and 342, the sub-program 308 causes the processor 222 to correlate the input data with output data, e.g. reconfiguration data, based on stored logic-enabled databases 264 and 266 (see FIG. 6(b)), and to store the result in the memory 218. Specifically, the user-inputted value for desired shot shape is subtracted from the user-inputted value for current shot shape, and the result is stored as an "actual adjustment" value. Using the database 264, the "actual adjustment" value is correlated with a "scaled adjustment" value. In some embodiments, the "actual adjustment" value is not scaled and, thus, relates to suggested reconfiguration information in direct proportion. However, in part to compensate for a user's tendency to exaggerate his or her shot deficiency, the trajectory information (in this case, the difference between the desired shot shape value and the actual shot shape value) is preferably scaled. Specifically, as exemplified by database 264, the relationship between the difference in shot shape value and at least one of the suggested face angle and lie angle is indirectly proportional.

Next, the database 266 is used to correlate the "scaled adjustment" value with reconfiguration information including a suggested "Face angle" value and a suggested "Lie angle" value, or, in some aspects of the present invention, notation corresponding to a shaft position in which the golf club 232 would bear the desired face angle and desired lie angle. Specifically, database 266 includes a vertical listing of twelve incremental positions of the shaft 238 of the golf club 232, each defined by a unique combination of face angle and lie offset value. The "scaled adjustment value" corresponds to the number of positions to shift vertically from the value corresponding to the current shaft position of the user's golf club to arrive at the suggested shaft position. A negative "scaled adjustment" value corresponds to an upward shift. A positive adjustment value corresponds to a downward shift. In some aspects of the present invention, such resulting reconfiguration information is stored, to be further manipulated, e.g. on the basis of input relating to environmental information. Alternatively, or in addition, the resulting reconfiguration information is displayed to the user at this point. In some aspects of the present invention, such reconfiguration information is displayed and the user is prompted to request whether to further consider environmental information which may result in a modification of such resulting reconfiguration information.

As an example of operation, a user having the golf club 232 indicates that the reconfigurable shaft 238 is currently configured such that the golf club 232 bears a face angle that is 1.0 degrees closed and a lie angle offset of 0.0 degrees. The user also inputs data indicating an "actual adjustment" value of 3. Using the database 264, the processor 222 correlates the "actual adjustment" value of 3 with a "scaled adjustment" value of 2. Using the database 266, the processor 222 determines a desired shaft configuration as having a face angle that is 1.5 degrees closed and a lie angle offset of 0.5 degrees.

Figure 6C:
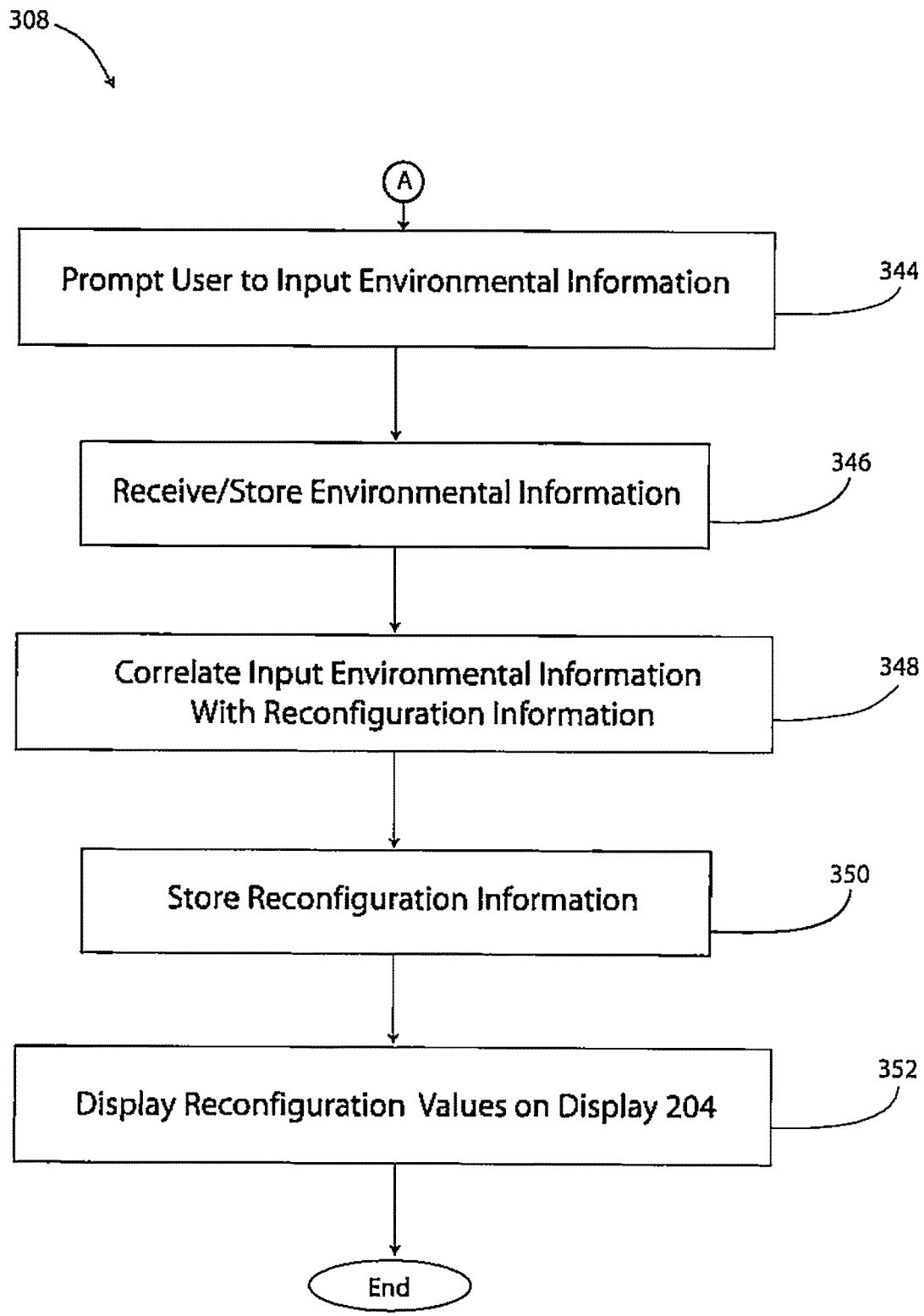
FIG. 6(c) is a flowchart exemplifying a sub-process of the golf-club fitting process of FIG. 4.
Figure 6D:
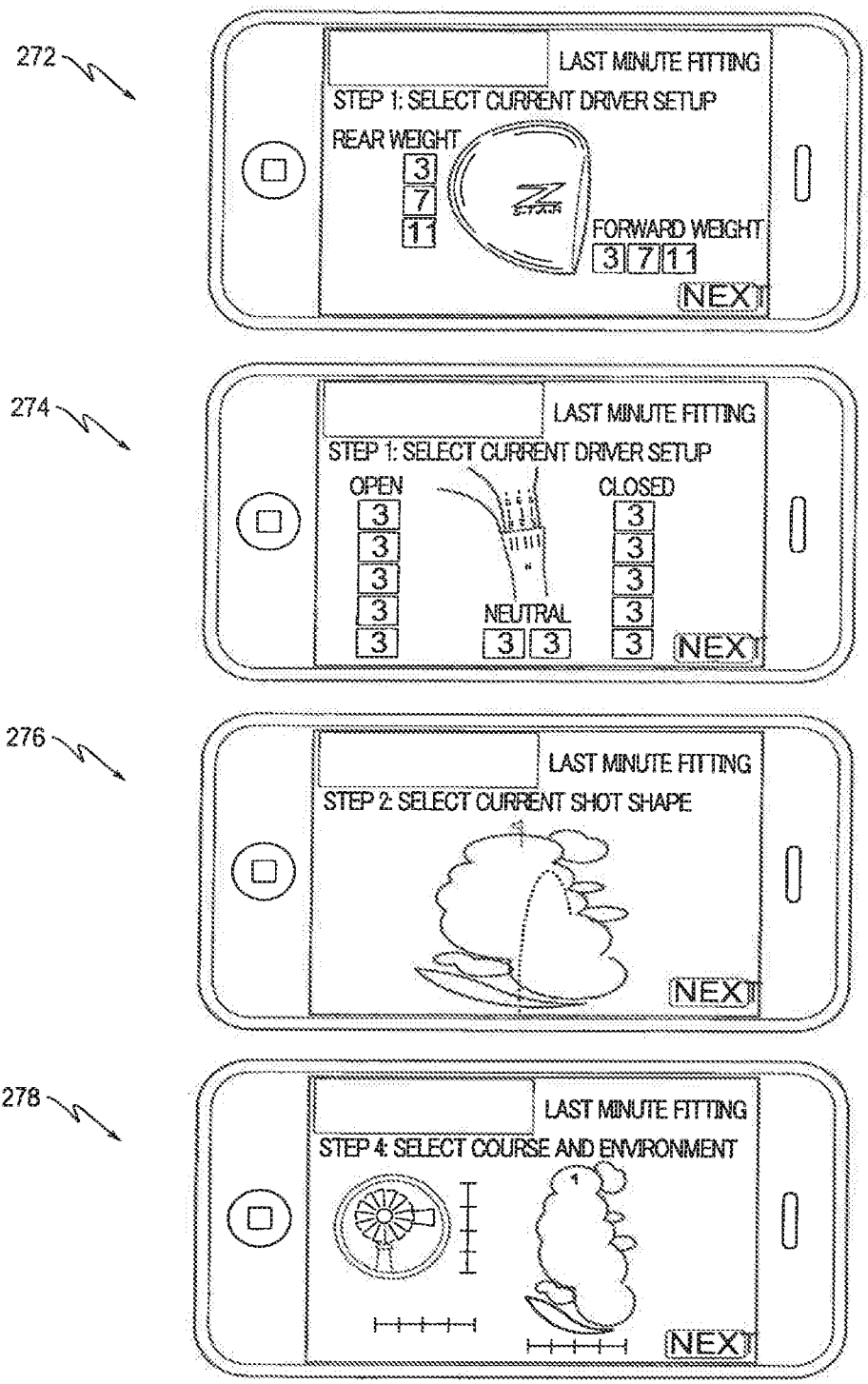
FIG. 6(d) illustrates various screen shots, displayed to a user, at various points during the execution of the sub-process of FIG. 6.

Referring to FIG. 6(c), in some aspects of the present invention, as discussed above, the sub-program 308 further includes steps 344 and 346, in which user-inputted information corresponding to environmental information is requested, received, and stored. Using a GUI 278 (see FIG. 6(d)), the environmental information includes a user selection of a value corresponding to "wind conditions," from among a plurality of incremental values from 1 to 5, where 1 corresponds to "Calm" and 5 corresponds to "Heavy Winds." The environmental information further includes a user selection of a value representing "Turf Conditions," from among a plurality of incremental values from 1 to 5, where 1 corresponds to "Soft" and 5 corresponds to "Firm." Further, the environmental information includes a user selection of a value representing "Fairway Conditions" from among a plurality of incremental values ranging from 1 to 5, where 1 corresponds to "Tight" and 5 corresponds to "Wide." The user-inputted selections are stored in the memory 218.

Figure 6E:
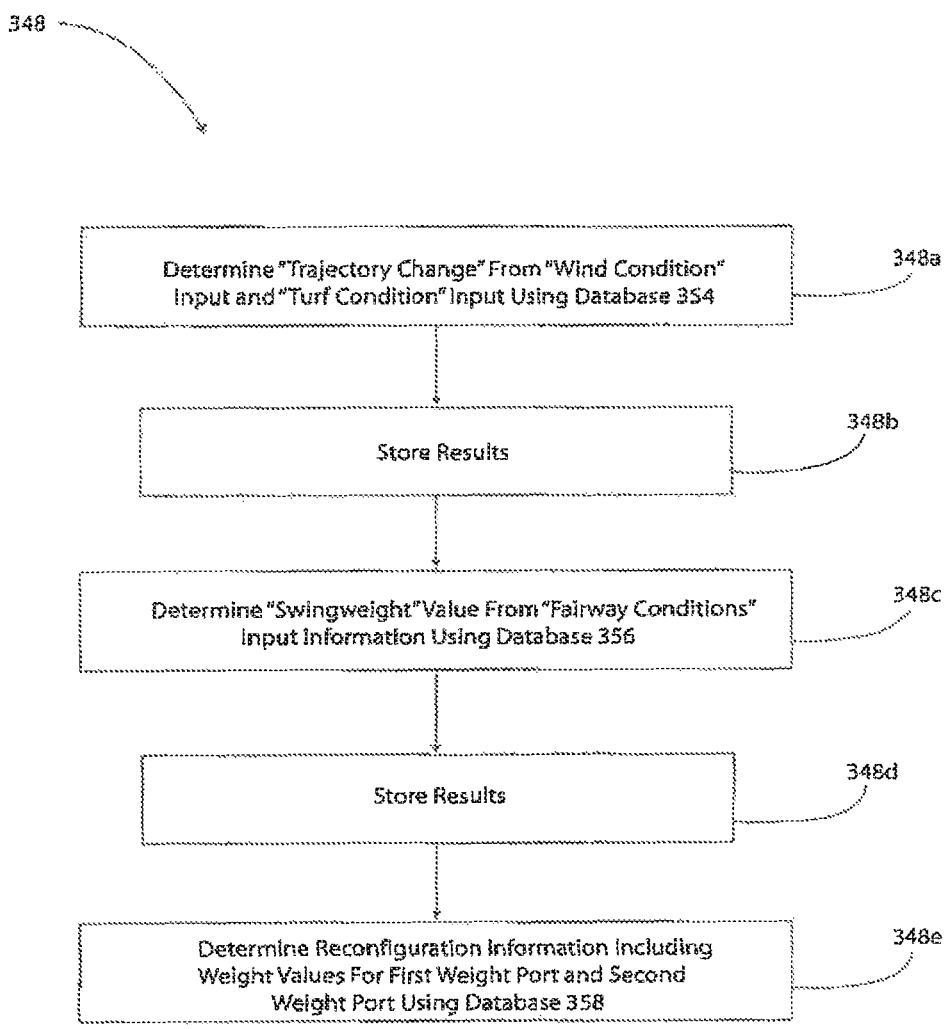
FIG. 6(e) is a flowchart showing further detail of step 348 of the sub-process of FIG. 6.

In step 348 and 350, the sub-program 308 causes the processor 222 to correlate the user-inputted environmental information with reconfiguration information for assisting the user in reconfiguring the golf club 232 for improving the performance thereof. Referring to FIG. 6(e), the step 348 is shown in further detail as including a plurality of sub-steps. In step 348a, the sub-program 308 causes the processor 222 to generate a "Trajectory change value," based on the "Wind conditions" input information and the "Turf conditions"

input information, by applying the logic relationships included in a database 354 (see FIG. 6(*f*)). The result is stored in step 348*b*. In step 348*c*, the sub-program 308 causes the processor 222 to determine a "Swing Weight" value, based on the input value of "Fairway Conditions," by applying the relationships included in a logic-enabled database 356 (see FIG. 6(*f*)), and the result is stored in step 348*d*. In step 348*e*, based on the results from steps 348*a* and 348*c*, the sub-program 308 causes the processor 222 to determine reconfiguration information, including a desired weight element value corresponding to the first weight port 244*a* and a desired weight element value corresponding to the second weight port 244*b*, by applying the logic relationships included in a logic-enabled database 358 (see FIG. 6(*g*)). The result is stored.

Referring again to FIG. 6(*c*), in step 352, the reconfiguration information, resulting from steps 344 and 348 are displayed on the display 204. From this displayed information, the user is able to appropriately reconfigure the golf club 232 in a manner that improves the performance of the golf club 232 for that user.

As an example of operation, a user inputs a current weight configuration that includes a front weight of 11 grams and a back weight of 3 grams, in step 332. In step 348*a*, the user inputs a "wind condition" value of 2 and a "turf condition" value of 3. The processor, using database 354 infers a "trajectory change value" of "higher." In step 348*c*, the user inputs a "fairway conditions" input of 2. Using the database 356, the processor infers a "swingweight" value of "Heavier," and stores the result in step 348*d*. Then, in step 348*e*, the processor infers reconfiguration information including a suggested weight configuration, using the database 358. Specifically, for the inputted current weight configuration, trajectory change value, and swing weight value, the processor infers a suggested weight configuration of a front weight of 11 grams and a back weight of 7 grams.

In one or more alternative aspects of the present invention, the user is prompted to input information related to location information, including one or more of a geographic location and/or a golf course identification. By receiving location information, the program may cause the processor to receive environmental information from a remote server or from data stored on memory 218, in place of, or in addition to, requesting and receiving environmental information directly from the user, e.g. in step 348*a*. Specifically, in these alternative aspects, the sub-program 308 causes the processor 222 to transmit the user-inputted location information to the remote server 216 via the transmitter 224, optionally using a conventional web service via the Internet or other network. Based on the location information, the remote server 216 transmits environmental information, such as wind condition, turf condition, and/or fairway size, to the processor 222. In some aspects of the present invention, the processor 222 converts the received environmental information to applicable values for use with the databases 354, 356, and 358, based on stored relationships governing such data conversion. For example, the processor 222

In one or more alternative aspects of the present invention, in place of, or in addition to, requesting and receiving user input of environmental information, including location information, as in step 344, the sub-program 308 acquires environmental information using the GPS receiver 228 and the remote server 216. Specifically, the sub-program 308 causes the processor 222 to request location data from a GPS satellite, via the GPS receiver 228. Based on the received location data, the sub-program 308 causes the processor 222 to request, receive and store the requisite environmental information pertaining to the received location data, from the remote server 216 via the Internet (or other network), the transmitter 224 and the receiver 220. If necessary, the processor 222 then converts the received environmental information to applicable values for use with the databases 354, 356, and 358, based on stored relationships governing such data conversion.

In one or more aspects of the present invention, any or all of the information received from a user may be stored on non-volatile memory such that the user may later retrieve such information for modification.

The user-input information and the reconfiguration information are not limited to those provided in the databases 354, 356, and 358. Similarly, the logic relationships that govern such input information and reconfiguration information are not limited to those provided in databases 354, 356, and 358. Thus, in alternative aspects of the present invention, input information may include any combination of the base golf club information, trajectory adjustment information, and environmental information described above, as well as any additional base golf club information, trajectory adjustment information, and environmental information known in the art, whereby logic relationships are provided governing such alternative, or additional, information, such logic relationships being developed computationally, empirically, and/or the like.

Additionally, or alternatively, base golf club information and/or trajectory adjustment information may be inputted to the mobile communication terminal 200 electronically through the use of sensory equipment in such connection with the mobile communication terminal 200 as to permit transfer of data. For example, golf club information may be detected by the mobile communication device using photographic devices and/or position sensors that are positioned in proximity of, or on, the golf club. The relative location of the position sensors, either alone, or in combination, may indicate specific properties of the golf club 232 such as lie angle, loft angle, and face angle. Additionally, or alternatively, identification devices positioned in proximity, or on, the golf club 232 may be used to transfer information to the mobile communication terminal 232 indicative of the identification of the golf club 232, optionally including data corresponding to predetermined properties thereof. Similarly, trajectory adjustment information may be determined electronically through the use of sensory devices in proximity of, or on, the golf club, and/or photographic devices such as electronic launch monitors. In some aspects of the present invention, such devices measure swing characteristics and/or trajectory characteristics and transfer data indicative of such characteristics to the mobile communication terminal 200 for use in conjunction with one or more software programs in accordance with the present invention.

Figure 7A:
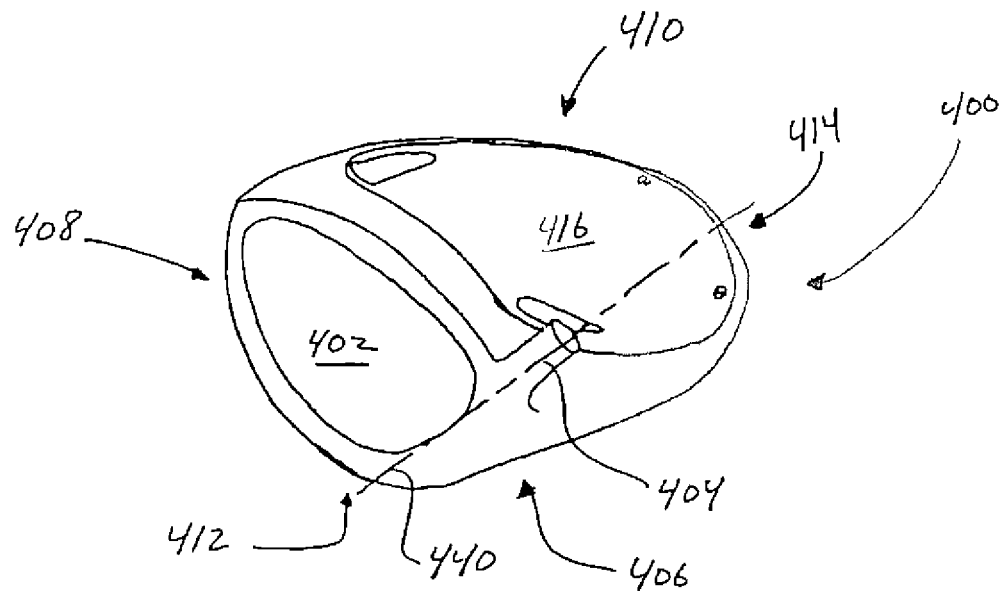
FIG. 7(a) is a front perspective view of an exemplary golf club head in accordance with one or more aspects of the present invention.
Figure 7B:
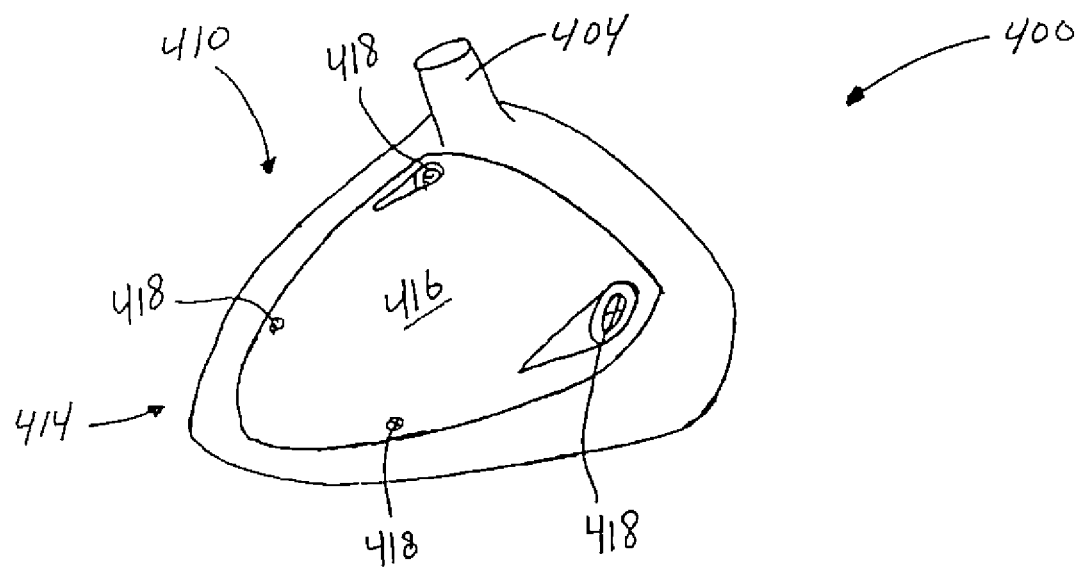
FIG. 7(b) is a rear perspective view of the exemplary golf club head of FIG. 7(a).
Figure 7C:
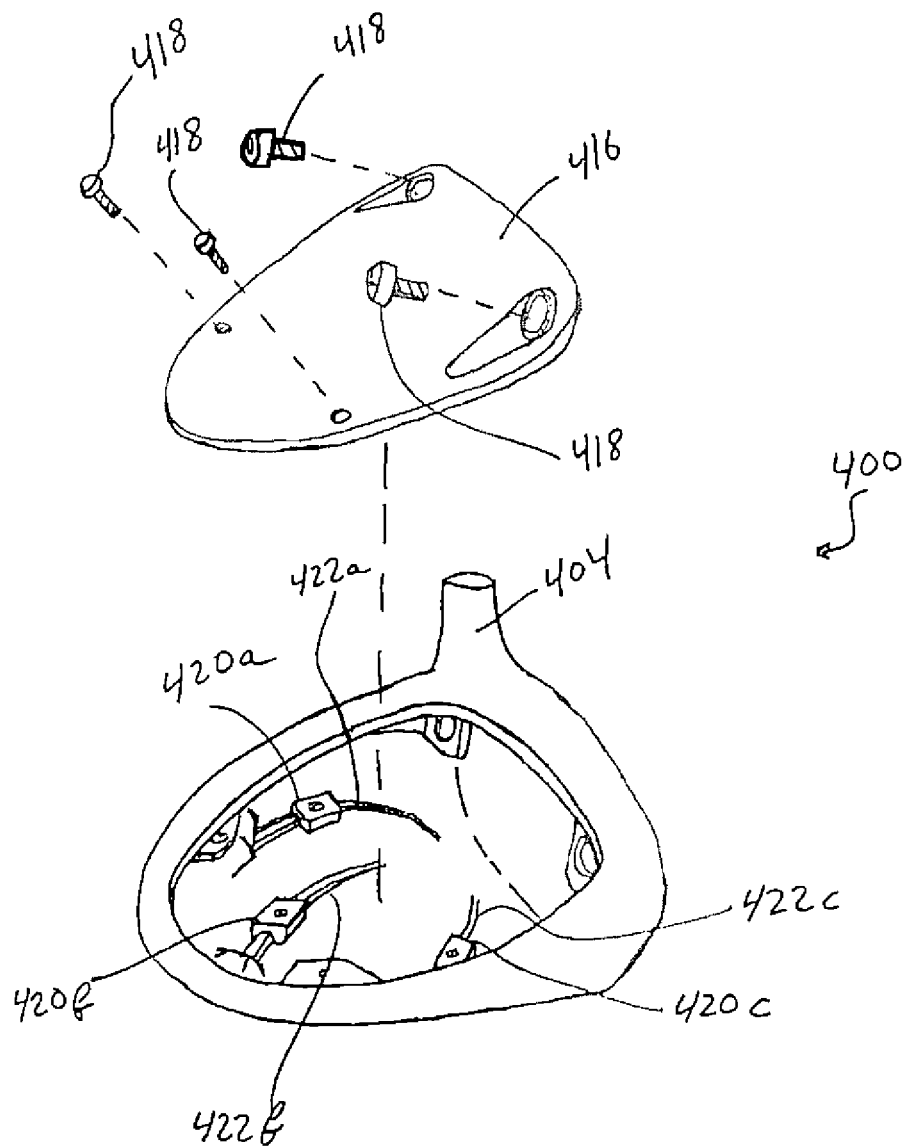
FIG. 7(c) is an exploded rear perspective view of the golf club head of FIG. 7(a).
Figure 7:
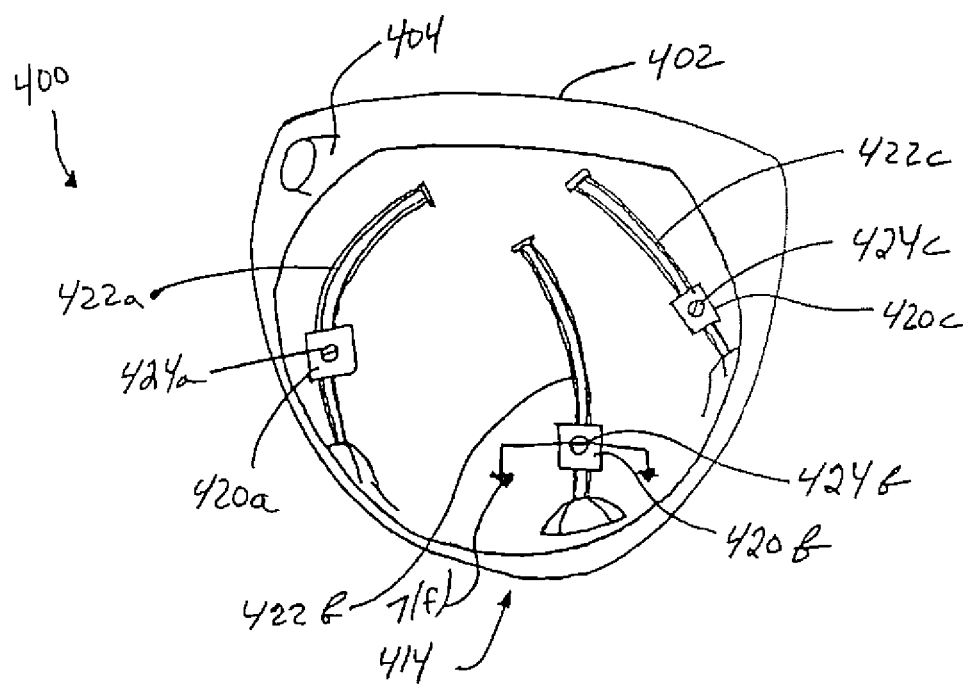
FIG. 7(d) is a top plan view of the golf club head of FIG. 7(a) with a cover plate removed.
FIG. 7(e) is a bottom rear perspective view of the golf club head of FIG. 7(a).
FIG. 7(f) is a cross-sectional view of the golf club head of FIG. 7(a), through the cross-section of 7(f), as shown in FIG. 7(d).
FIG. 7(g) is a heel-side elevational view of the golf club head of FIG. 7(a), with paths superimposed thereon.
FIG. 7(h) is a front perspective view of an adjustment tool, in accordance with one or more aspects of the present invention.
FIG. 7(i) is a diagrammatical view of the adjustment tool of FIG. 7(h).
FIG. 7(j) is a vertical cross-sectional view of the adjustment tool of FIG. (h) in combination with a portion of the golf club head of FIG. 7(a), in an operating position.

Referring to FIGS. 7(*a*) and 7(*b*), in one or more aspects of the present invention, a golf club head 400 is shown having a top portion 410, a bottom portion 412 opposite the top portion 410, a heel portion 406, and a toe portion 408 opposite the heel portion 406. A hosel 404 extends from the top portion 410 proximate the heel portion 406 for receiving a shaft (not shown). The hosel 404 includes a hosel centerline 440. The golf club head 400 further includes a striking face 402 for hitting a golf ball, and a rear portion 414 opposite the striking face 402. A removable cover plate 416 is located proximate the top portion 410. Referring specifically to FIG. 7(*b*), the cover plate 416 is secured to the golf club head 400 with fasteners 418. In one or more aspects of the present invention, the fasteners 418 comprise screws and may be inserted and removed using a conventional tool such as a screwdriver, wrench, allen wrench, allen key, or the like. In alternative aspects of the present invention, the golf club head 400 include a removable sole plate, in place of the removable cover plate 416, for accessing elements located on the interior surface of the golf club head 400. In alternative aspects of the present invention, a portion of the golf club head 400 that includes at least a portion of the top portion 410 and at least a portion of the bottom portion 412 is removable.

Referring to FIGS. 7(c) and 7(d), when the cover plate 416 is removed, movable weight members 420a, 420b, and 420c are revealed. The first weight element 420a is translatable on a first parabolic path 422a. The second weight element is translatable on a second parabolic path 422b. The third weight element 420c is translatable on a third parabolic path 422c. In alternative aspects of the present invention, any or all of the paths 422a, 422b, and 422c comprise linear or curvilinear paths. As shown in FIG. 7(d), fasteners 424a, 424b, and 424c, secure each of weight element 420a, 420b, and 420c to the golf club head 400. Once each of the fasteners 424a, 424b, and 424c are loosened, the weight elements 420a, 420b, and 420c are free to slide along each of paths 422a, 422b, and 422c, respectively.

Figure 7E:
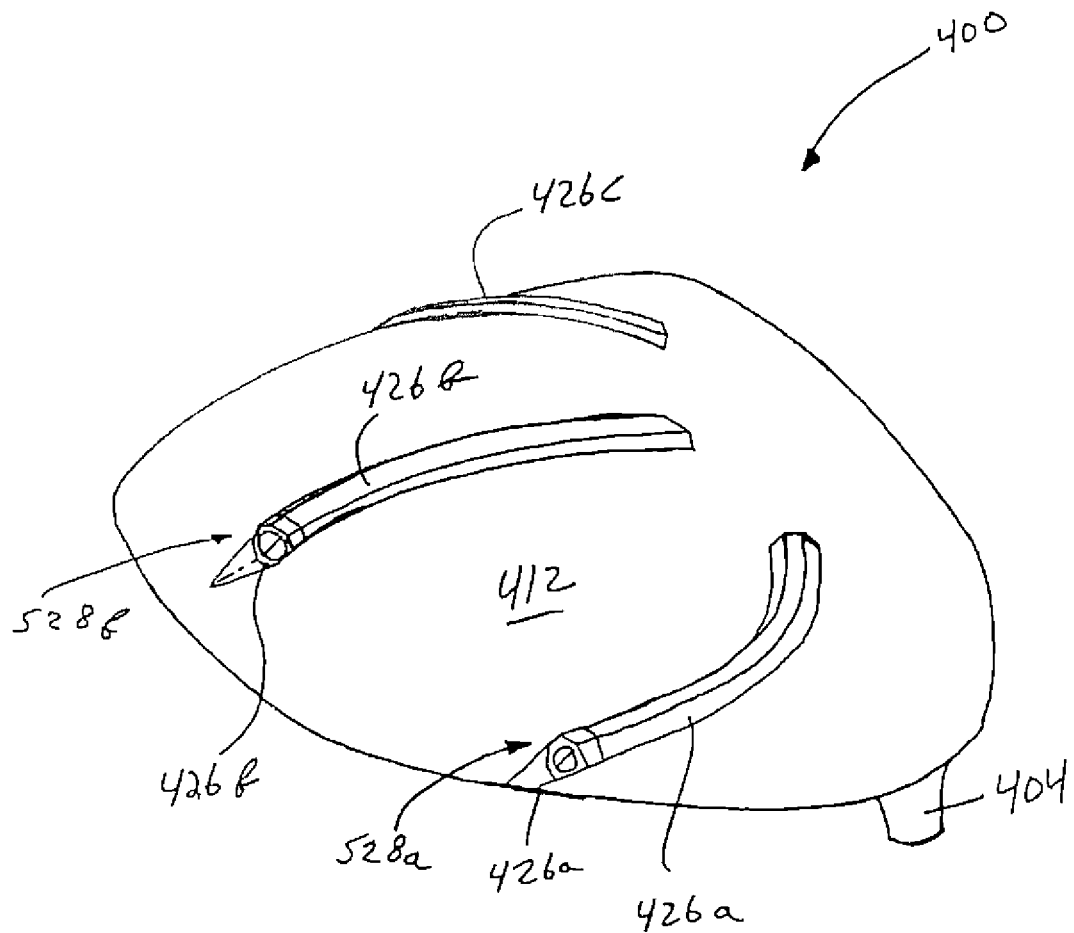
Figure 7P:
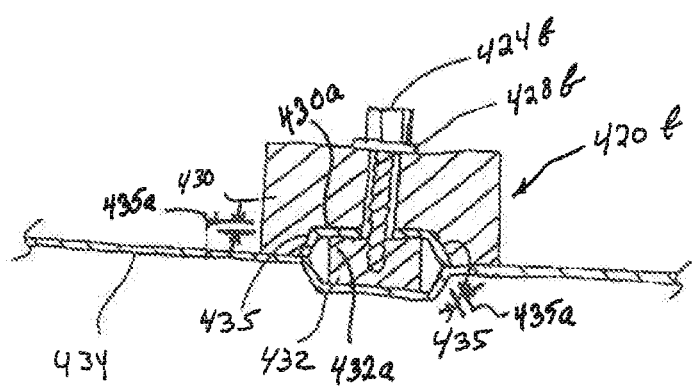

Referring to FIG. 7(e), each of the paths 422a, 422b, and 422c form protrusions visible from the exterior of the bottom portion 412 of the golf club head 400. In alternative aspects of the present invention, such protrusions include generally hemispherical cross-sectional profiles. In other aspects of the present invention, the paths 422a, 422b, and 422c do not form protrusions extending outward from the bottom portion 412 of the golf club head 400, but are flush with the general contour of the bottom portion 412. The paths include ports 528a, 528b, and 528c (not shown), each covered with end caps 426a, 426b, and 426c, respectively. Once the end caps 426a, 426b, and 426c are removed, the weight elements 420a, 420b, and 420c are accessible through the exterior surface of the golf club head 400. The end caps 426a, 426b, and 426c may therefore serve as retaining inserts configured to confine the weight elements 420a, 420b, and 420c within their respective weight paths 422a, 422b, and 422c.

Referring to FIG. 7(f), in one or more aspects of the present invention, the weight member 420b is shown in cross-section 7(f) (see FIG. 7(d)). As shown, the second weight member 420b includes an upper, or second, weight portion 430 and a lower, or first, weight portion 432. To refer to relative portions of other weight members, e.g. weight members 420a and 420c, the upper portion 430 may further be denoted as a second second weight portion and the lower portion 432 may be denoted as second first weight portion thereby indicating their association with the second weight member 420b. The lower portion 432 and the upper portion 430 are separated by L-shaped ribs 435, which extend the length of the path 422b. As shown in FIG. 7(f), at least one of the ribs 435 may have a substantially constant thickness 435a. When the fastener 424b is tightened, the upper portion 430 and the lower portion 432 are compressed against the L-shaped ribs 435, securing the weight 420b in place. More specifically, when secured, at least a portion 432a of the lower weight portion 432 may be located within a recessed region 430a of a contact surface of the upper weight portion 430. In one or more aspects of the present invention, weight members 420a and 420c are similarly configured to weight member 420b and include like structural features. In such embodiments where the first and third weight members 420a and 420c include upper and lower portions similar to respective upper and lower portions of the weight member 420b, the lower portion and the upper portion of the first weight member 420a may be denoted as the first first weight portion and the first second weight portion, respectively, and the lower portion and the upper portion of the third weight member 420c may be denoted as the third first weight portion and the third second weight portion, respectively.

Figure 7G:
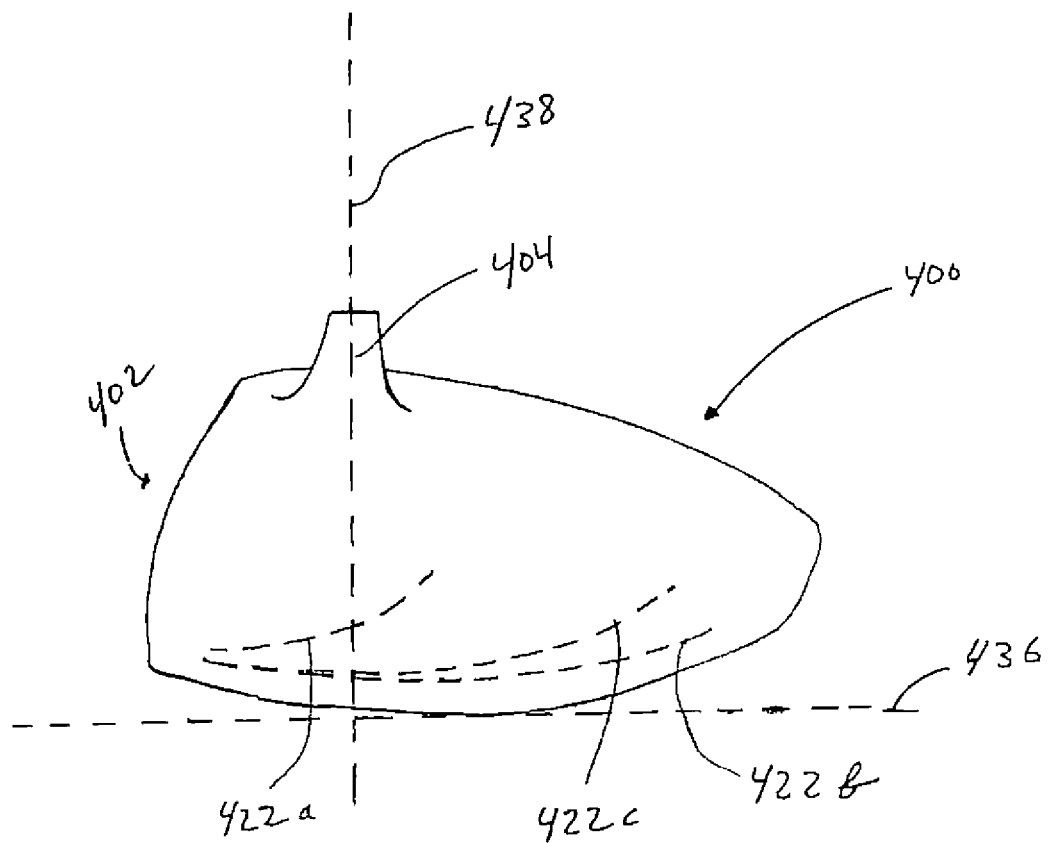

Referring to FIG. 7(g), the golf club head 400 is shown in a reference position. "Reference position," as used herein, denotes a position of the club head 400 where the hosel centerline 440 is oriented at a lie angle of 60° with respect to a horizontal ground plane 436 and lies in an imaginary vertical hosel plane 438, which contains an imaginary horizontal line generally parallel to the striking face 402. The paths 422a, 422b, and 422c are each shown, represented as curvilinear dashed lines. When the golf club head 400 is in the reference position, each path 422a, 422b, and 422c extends both in the front to rear direction as well as in the top to bottom direction. This path configuration permits greater flexibility in adjusting the position of the center of gravity and/or moments of inertia of the golf club head 400.

Figure 7H:
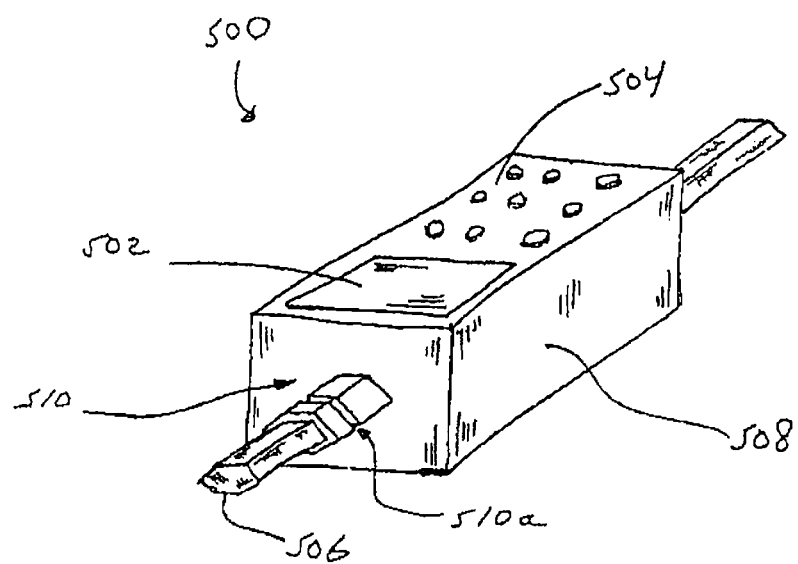

Referring to FIG. 7(h), an adjustment tool 500 is shown. The adjustment tool may be electrically powered, e.g. by removable batteries or other DC power source, or by AC power source, e.g. through a conventional electrical outlet. The adjustment tool 500 includes an electronic display 502, a user interface 504, a casing 508, a spout 510 having a depressed annulus 510a, and a pusher 506. In one or more aspects of the present invention, the pusher 506 comprises a flexible but relative non-compressible material such that the pusher 506 may flex in the radial direction, but be substantially rigid in the axial direction.

Figure 7I:
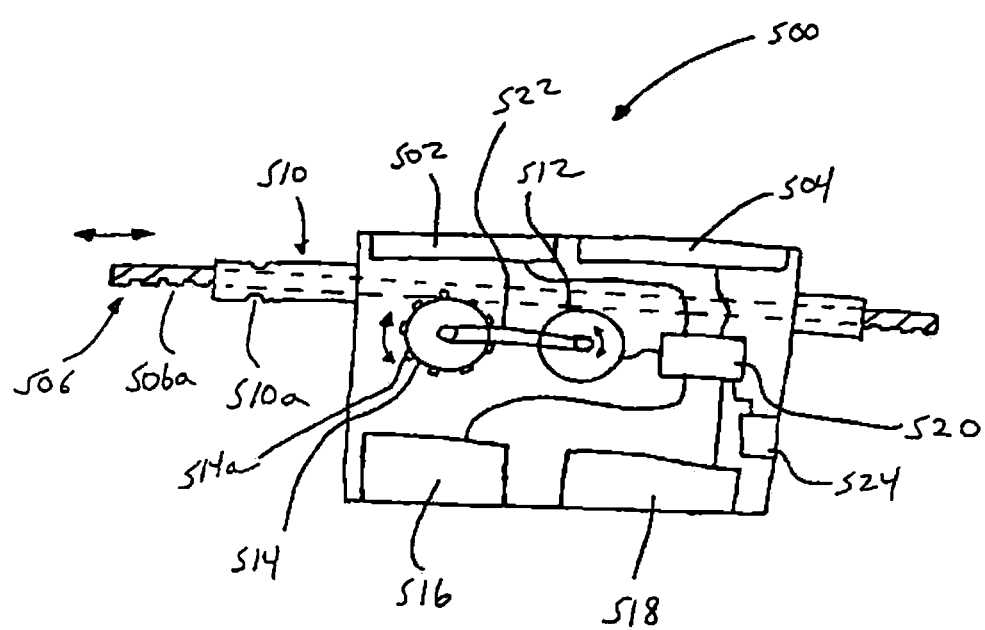

Referring to FIG. 7(i), the adjustment tool 500 includes a controller 520, which may comprise a hardware processor, a servo motor 512, controlled by the controller 520, and a drive gear 514 connected to the servo motor 512 by a pulley 522. The drive gear 514 includes teeth 514a and is capable of rotating in a forward and rearward direction. As the drive gear 514 rotates, the teeth 514a of the drive gear 514 engage with the teeth 506a of the pusher 506, resulting in linear motion of the pusher 506. The adjustment tool 500 further includes a receiver/transmitter 524 for receiving and transmitting data from a remote data source such as a personal computer, mobile communication terminal, or electronic launch monitor. The controller 520 also communicates with a memory 516, which includes a non-volatile memory device, a volatile memory device, or both. Thus, the controller 520 may access the memory 516 or a remote memory device accessible through the input/output device 524 to run one or more user-interactive adjustment software programs, as discussed below.

Figure 7J:
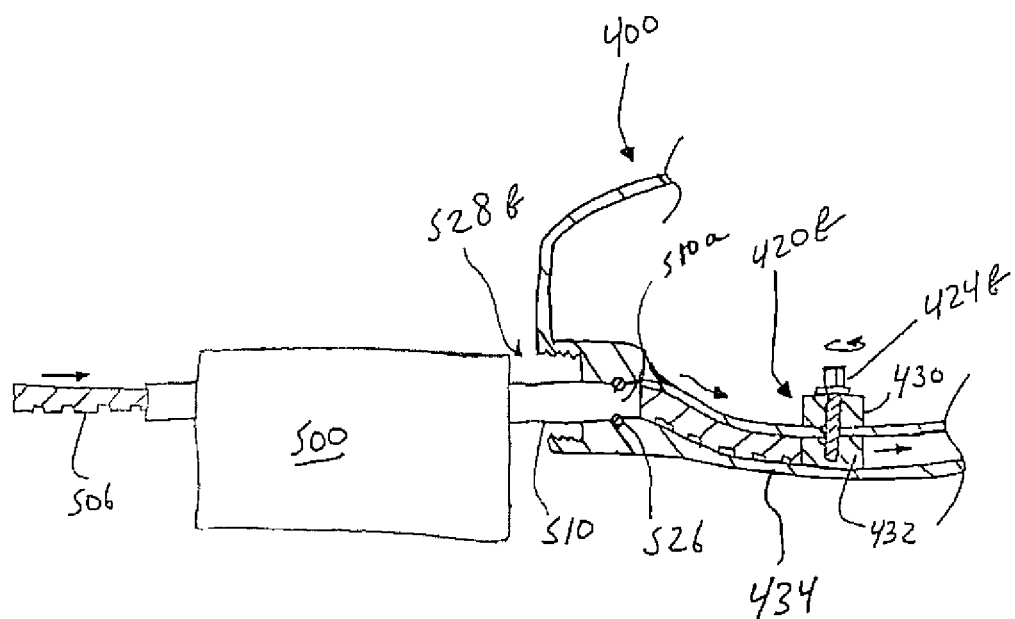

As shown in FIG. 7(j), the adjustment tool 500 is engageable with the golf club head 400. Specifically, the spout 510 of the adjustment tool 500 in insertable into the port 528b of the bottom portion 412 of the golf club head 400, once the end cap 416b is removed. The recessed annulus 510a axially coincides with an O-ring 526 located within the port 528b to ensure secure engagement and, in some aspects of the present invention, to ensure that the position of the spout 510 remains consistently positioned. Once the adjustment tool 500 is engaged with the golf club 400, the pusher 506 is configured to fit within a space formed between the wall 434 of club head 400 and the L-shaped ribs 435. The pusher 506 is adapted to engage with the lower portion 432 of the weight element 420b. Once the fastener 424b is loosened, then the weight element 420b is configured to move under the force of the pusher 506.

Based on the design of the adjustment tool 500 and the golf club head 400, software programs, embodied on computer-readable medium, to be carried out by the hardware controller 520, may be adapted to precisely position each of the weight elements 420a, 420b, and 420c. For example, the user may input, inter alia, trajectory adjustment information, including information pertaining to user's current shot shape and desired shot shape. Using predetermined relationships governing the center of gravity location and moments of inertia as affected by the repositioning of each of the weight elements 420a, 420b, and 420c, the controller 520 is capable of prescribing precisely the position of the weight elements 420a, 420b, and 420c, necessary to appropriately modify performance characteristics of the golf club head 400.

Once the trajectory adjustment information is inputted, the controller 520 causes the display 502 to prompt the user to secure the adjustment tool 500 within the first port 528a. Once engaged, the user indicates engagement is successful. Then the controller 520 causes the server motor 512 to operate the drive gear 514 until the controller 520 determines that the calculated position of the pusher 506 coincides with a desired position of the weight element 420a for achieving a desired center of gravity location and/or club head inertial properties. Such determinations are based on stored modeling of the shape of the paths 422a, 422b, and 422c, as well as stored relationships governing the position of the end of the pusher 506 with rotational displacement of the servo motor 512. Such determinations are also based on stored modeling data correlating the positions of each of the weight elements 420a, 420b, and 420c with the center of gravity and the moments of inertia of the golf club head 400. In alternative aspects of the present invention, the servo motor 512 is substituted by other position sensing drivers known in the art, such as hydraulic drivers, pneumatic drivers, magnetic drivers, or the like.

In one or more aspects of the present invention, once the end of the pusher 506 corresponds to the appropriate adjustment position, the servo motor 512 stops driving the drive gear 514, and, in some aspects of the present invention, retracts the pusher 506. The user may then use the interface 504 to advance the program to perform adjustment of the second weight element 420b, and ultimately the third weight element 420c. Either by the detection of position, or by user input using the interface 504, the controller 520 receives information pertaining to which weight element is currently being adjusted, such that the controller 520 may appropriately step through the software program. Such adjustments occur in like manner to the adjustment of the position of the first weight element 420a. In operation, the user may then tighten the weight elements 420a, 420b, and 420c to secure them in place. By using data modeling, and an adjustment tool capable of precise motion, weight adjustment may be carried out with greater accuracy and users may have greater ability to capitalize on the degree of adjustability of the golf club.

While various features have been described in conjunction with the examples outlined above, various alternatives, modifications, variations, and/or improvements of those features and/or examples may be possible. Accordingly, the examples, as set forth above, are intended to be only illustrative. Various changes may be made without departing from the broad spirit and scope of the underlying principles.

What is claimed is:

1. A wood-type golf club head comprising:
   a striking wall;
   a top portion;
   a bottom portion comprising a club head wall portion, a first pair of ribs projecting from the wall portion, and a second pair of ribs projecting from the wall portion, wherein the first pair of ribs and the wall portion form a first elongate recess defining a first weight path and wherein the second pair of ribs and the wall portion form a second elongate recess defining a second weight path;
   a first weight element translatable along the first weight path and comprising a first first weight portion, a first second weight portion, and a first fastener, the first pair of ribs each being interposed between the first first weight portion and the first second weight portion such that the first first weight portion is located proximate the club head wall portion and the first second weight portion is located distal the club head wall portion, the first fastener being configured to secure the first weight element to the bottom portion by rotating independently of the first first and first second weight portions to compress the first first and first second weight portions against the first pair of ribs; and
   a second weight element translatable along the second weight path and comprising a second first weight portion, a second second weight portion, and a second fastener, the second pair of ribs each being interposed between the second first weight portion and the second second weight portion such that the second first weight portion is located proximate the club head wall portion and the second second weight portion is located distal the club head wall portion, the second fastener being configured to secure the second weight element to the bottom portion by rotating independently of the second first and second second weight portions to compress the second first and second second weight portions against the second pair of ribs.

2. The golf club head of claim 1, wherein at least one of the first weight path and the second weight path comprises a linear path.

3. The golf club head of claim 1, wherein at least one of the first weight path and the second weight path comprises a curvilinear path.

4. The golf club head of claim 1, further comprising a third pair of ribs projecting from the wall portion, wherein the third pair of ribs and the wall portion form a third elongate recess defining a third weight path.

5. The golf club head of claim 1, wherein the first weight path and the second weight path extend in a front to rear direction.

6. The golf club head of claim 1, wherein the first and second fasteners each comprise a threaded portion.

7. The golf club head of claim 1, wherein the striking wall, the top portion, and the bottom portion form a substantially hollow interior cavity.

8. The golf club head of claim 1, wherein at least one of the first pair of ribs and the second pair of ribs comprises a substantially constant thickness.

9. The golf club head of claim 1, further comprising a removable cover plate for accessing interior elements of the club head, the removable cover located proximate the top portion.

10. The golf club head of claim 1, wherein the first weight path further comprises a longitudinal end and a retaining insert is located proximate the longitudinal end, the retaining insert configured to confine the first weight element within the first weight path.

11. The golf club head of claim 1, wherein the first second weight portion comprises a contact surface that is complementary to, and shaped to mate with, the bottom portion of the club head.

12. The golf club head of claim 1, wherein the first second weight portion comprises a contact surface including a recessed region and, when the first weight element is in a secured position, at least a portion of the first first weight portion is located within the recessed region.

13. A wood-type golf club head comprising:
a striking wall;
a top portion;
a bottom portion comprising a club head wall portion, a first pair of ribs projecting from the wall portion, and a second pair of ribs projecting from the wall portion, wherein the first pair of ribs and the wall portion form a first elongate recess defining a first linear weight path and wherein the second pair of ribs and the wall portion form a second elongate recess defining a second linear weight path;
a first weight element translatable along the first weight path and comprising a first first weight portion, a first second weight portion, and a first fastener, the first pair of ribs each being interposed between the first first weight portion and the first second weight portion such that the first first weight portion is located proximate the club head wall portion and the first second weight portion is located distal the club head wall portion, the first fastener being configured to secure the first weight element to the bottom portion by rotating independently of the first first and first second weight portions to compress the first first and first second weight portions against the first pair of ribs; and
a second weight element translatable along the second weight path and comprising a second first weight portion, a second second weight portion, and a second fastener, the second pair of ribs each being interposed between the second first weight portion and the second second weight portion such that the second first weight portion is located proximate the club head wall portion and the second second weight portion is located distal the club head wall portion, the second fastener being configured to secure the second weight element to the bottom portion by rotating independently of the second first and second second weight portions to compress the second first and second second weight portions against the second pair of ribs.

14. The golf club head of claim 13, further comprising a third pair of ribs projecting from the wall portion, wherein the third pair of ribs and the wall portion form a third elongate recess defining a third weight path.

15. The golf club head of claim 13, wherein the first weight path and the second weight path extend in a front to rear direction.

16. The golf club head of claim 13, wherein at least one of the first pair of ribs and the second pair of ribs comprises a substantially constant thickness.

17. The golf club head of claim 13, wherein the first weight path further comprises a longitudinal end, and a retaining insert is located proximate the longitudinal end, the retaining insert configured to confine the first weight element within the first weight path.

18. The golf club head of claim 13, wherein the first second weight portion comprises a contact surface that is complementary to, and shaped to mate with, the bottom portion of the club head.

19. The golf club head of claim 13, wherein the first second weight portion comprises a contact surface including a recessed region and, when the first weight element is in a secured position, at least a portion of the first first weight portion is located within the recessed region.

20. The golf club head of claim 13, wherein the first and second fasteners each comprise a threaded portion.

* * * * *